United States Patent
Ozawa et al.

(10) Patent No.: US 9,185,386 B2
(45) Date of Patent: Nov. 10, 2015

(54) VIDEO PROCESSING DEVICE, TRANSMISSION DEVICE, VIDEO PROCESSING SYSTEM, VIDEO PROCESSING METHOD, TRANSMISSION METHOD, COMPUTER PROGRAM AND INTEGRATED CIRCUIT

(75) Inventors: Yuka Ozawa, Osaka (JP); Toru Kawaguchi, Osaka (JP); Hiroshi Yahata, Osaka (JP); Yasushi Uesaka, Hyogo (JP); Tomoki Ogawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 329 days.

(21) Appl. No.: 13/885,240

(22) PCT Filed: May 30, 2012

(86) PCT No.: PCT/JP2012/003524
§ 371 (c)(1),
(2), (4) Date: May 14, 2013

(87) PCT Pub. No.: WO2012/164920
PCT Pub. Date: Dec. 6, 2012

(65) Prior Publication Data
US 2013/0229489 A1    Sep. 5, 2013

Related U.S. Application Data

(60) Provisional application No. 61/492,057, filed on Jun. 1, 2011.

(51) Int. Cl.
*H04N 7/26* (2006.01)
*H04N 13/00* (2006.01)

(52) U.S. Cl.
CPC ......... *H04N 13/0059* (2013.01); *H04N 13/007* (2013.01); *H04N 13/0066* (2013.01)

(58) Field of Classification Search
CPC .......... H04N 13/0062; H04N 13/0048; H04N 13/007; H04N 13/0059; H04N 19/597; H04N 21/23614; H04N 21/4884; H04N 21/2362; H04N 21/4345; H04N 21/4348; H04N 21/236
See application file for complete search history.

(56) References Cited

U.S. PATENT DOCUMENTS 8,150,238 B2 *   4/2012   Sasaki et al. .................. 386/337
2010/0067873 A1 *   3/2010   Sasaki et al. .................... 386/95
(Continued)

FOREIGN PATENT DOCUMENTS

CN   101964915   2/2011
JP   2010-109487   5/2010
(Continued)

OTHER PUBLICATIONS

International Search Report issued Aug. 21, 2012 in International (PCT) Application No. PCT/JP2012/003524.
(Continued)

*Primary Examiner* — Victor Kostak
(74) *Attorney, Agent, or Firm* — Wenderoth, Lind & Ponack, L.L.P.

(57) ABSTRACT

Provided is a video processing device that quickly identifies a distribution mode of a stream of display data, e.g., subtitles, and reproduces the data according to the distribution mode. The video processing device receives a transport stream including additional information and a data stream of display data to be displayed along with a 3D video, the additional information indicating whether the transport stream further includes left-view and right-view data streams generated from left-view and right-view data used for displaying the display data; determines whether the transport stream includes the left-view and the right-view data streams based on the additional information; and reproduces the left-view and the right-view data from the left-view and the right-view data streams when the transport stream includes the left-view and the right-view data streams, and reproduces alternative left-view and right-view data when the transport stream does not include the left-view and the right-view data streams.

17 Claims, 23 Drawing Sheets

(56) References Cited

U.S. PATENT DOCUMENTS

| | | |
|---|---|---|
| 2010/0128813 A1* | 5/2010 | Abbasfar et al. .............. 375/295 |
| 2010/0157025 A1* | 6/2010 | Suh et al. .................... 348/51 |
| 2011/0018966 A1 | 1/2011 | Kitazato |
| 2011/0037833 A1* | 2/2011 | Lee et al. .................... 348/46 |
| 2011/0074921 A1* | 3/2011 | Takiduka et al. .............. 348/43 |
| 2011/0075989 A1 | 3/2011 | Hattori |
| 2011/0090306 A1 | 4/2011 | Suh et al. |
| 2011/0090312 A1 | 4/2011 | Uchimura |
| 2011/0141238 A1 | 6/2011 | Tsukagoshi |
| 2011/0164111 A1* | 7/2011 | Karaoguz et al. .............. 348/43 |
| 2011/0267426 A1* | 11/2011 | Suh et al. .................... 348/43 |
| 2011/0273532 A1* | 11/2011 | Kitazato et al. ................ 348/43 |
| 2011/0292174 A1* | 12/2011 | Suh et al. .................... 348/43 |
| 2011/0310224 A1* | 12/2011 | Lee et al. .................... 348/43 |
| 2012/0044324 A1* | 2/2012 | Lee et al. .................... 348/43 |
| 2012/0050473 A1* | 3/2012 | Suh et al. .................... 348/43 |
| 2012/0069146 A1* | 3/2012 | Lee et al. .................... 348/43 |
| 2012/0081516 A1* | 4/2012 | Tsukagoshi .................... 348/43 |
| 2012/0106921 A1* | 5/2012 | Sasaki et al. .................. 386/230 |

FOREIGN PATENT DOCUMENTS

| | | |
|---|---|---|
| JP | 2010-263616 | 11/2010 |
| JP | 2010-268432 | 11/2010 |
| JP | 2011-28791 | 2/2011 |
| WO | 2010/147289 | 12/2010 |
| WO | 2011/001855 | 1/2011 |

OTHER PUBLICATIONS

ISO/IEC 13818-1, "Information technology—Generic coding of moving pictures and associated audio information: Systems", Apr. 15, 1996.

* cited by examiner

FIG. 1
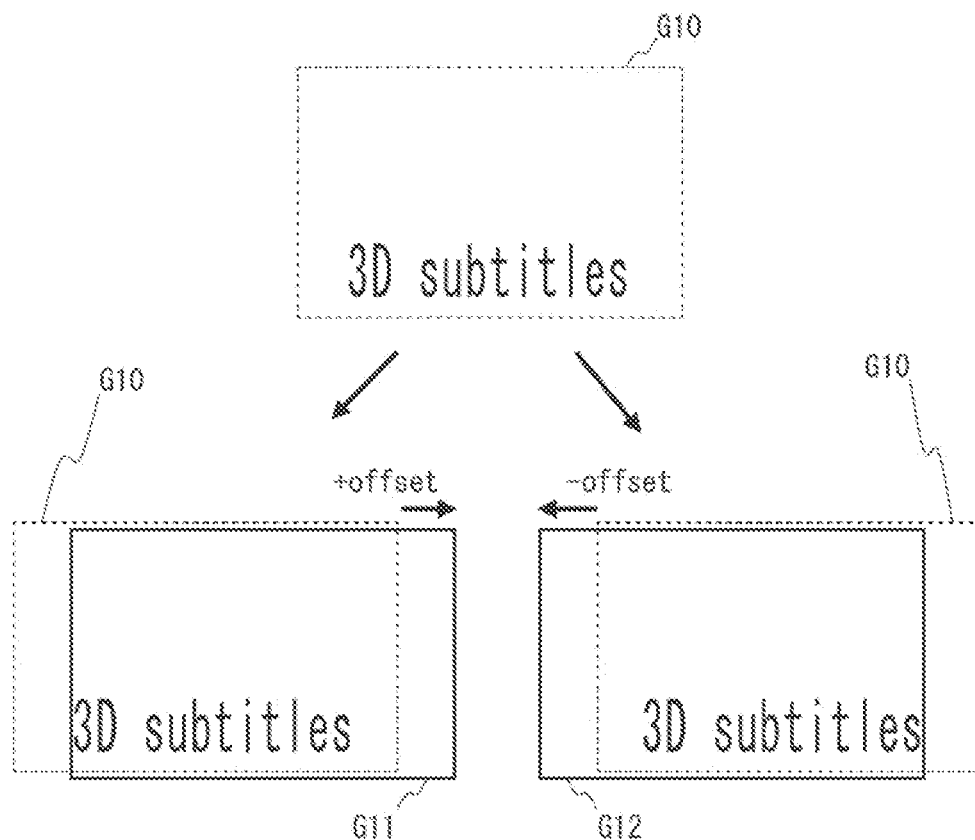
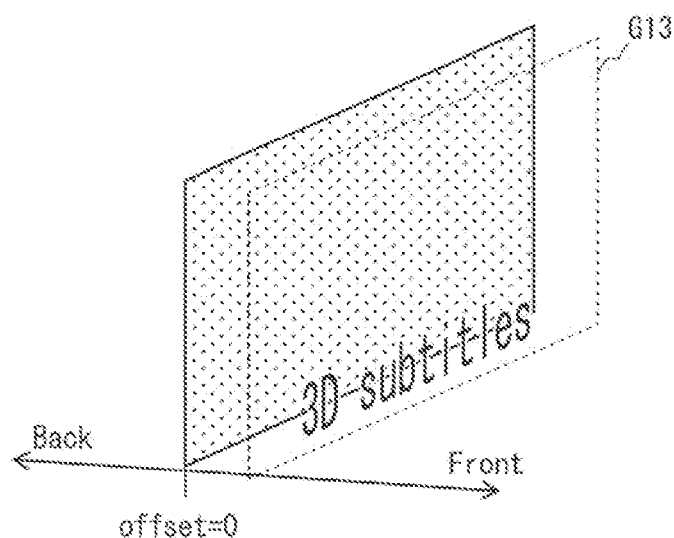

FIG. 5

| ES name | stream_type | view | PID | component_tag | |
|---|---|---|---|---|---|
| Left-view video images | 0x10 | left | 0x0110 | 0x10 | T101 |
| Right-view video images | 0x10 | right | 0x0111 | 0x11 | |
| 1ES subtitles | 0x06 | -- | 0x0112 | 0x30 | T102 |
| Left-view subtitles | 0x06 | left | 0x0113 | 0x31 | T103 |
| Right-view subtitles | 0x06 | right | 0x0114 | 0x32 | T104 |

(Table T100)

FIG. 7

3D subtitle pair descriptor D200

```
stereoscopic_subtitle_pair_descriptor() {
  descriptor_tag        8 uimsbf
  descriptor_length     8 uimsbf
  subtitle_view         1 bslbf
  reserved              2 bslbf
  pair_PID             13 bslbf

| | | |
|---|---|---|
| stream_type | 0x06 | D300 |
| Elementary_PID | 0x0113 | D301 |
| { | | |
| descriptor_tag | 0x80 | D302 |
| descriptor_length | 0x2 | |
| subtitle_view | 0x0 | |
| reserved | 0x2 | |
| pair_PID | 0x0114 | |
| descriptor_tag | 0x52 | D303 |
| descriptor_length | 0x1 | |
| component_tag | 0x31 | |
| } | | |
| stream_type | 0x06 | |
| Elementary_PID | 0x0114 | D304 |
| { | | |
| : | | |
| } | | |
| stream_type | 0x10 | |
| Elementary_PID | 0x0111 | D305 |
| { | | |
| : | | |
| } | | |
| stream_type | 0x10 | |
| Elementary_PID | 0x0112 | D306 |
| { | | |
| : | | |
| } | | |
| stream_type | 0x06 | D307 |
| Elementary_PID | 0x0113 | |
| { | | |
| : | | |
| } | | |

FIG. 13A
FIG. 13B
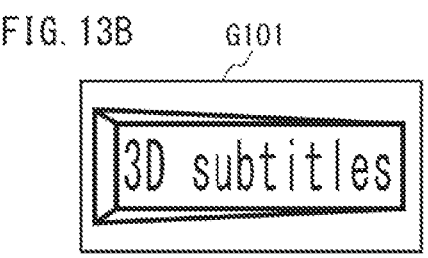
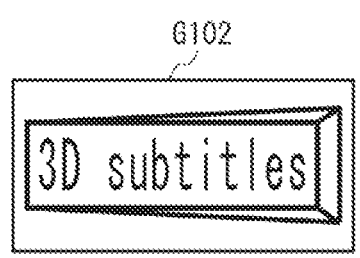

FIG. 17

3D subtitle descriptor D500

```
stereoscopic_subtitle_descriptor() {
  descriptor_tag        8 uimsbf
  descriptor_length     8 uimsbf
  subtitle_mode         1 bslbf
  subtitle_component    1 bslbf
  if(subtitle_mode==1&subtitle_component==1) {
    subtitle_view       1 bslbf
    pair_PID           13 bslbf
  }else{
    reserved           14 bslbf
  }
}
```

FIG. 18

| | | |
|---|---|---|
| stream_type | 0x06 | D601 |
| Elementary_PID | 0x0112 | |
| { | | |
| descriptor_tag | 0x81 | D602 |
| descriptor_length | 0x2 | |
| subtitle_mode | 0x0 | |
| subtitle_component | 0x0 | |
| reserved | 0x3FFF | |
| } | | |
| stream_type | 0x06 | D603 |
| Elementary_PID | 0x0113 | |
| { | | |
| descriptor_tag | 0x81 | D604 |
| descriptor_length | 0x2 | |
| subtitle_mode | 0x1 | |
| subtitle_component | 0x1 | |
| subtitle_view | 0x0 | |
| pair_PID | 0x114 | |
| } | | |
| ⋮ | | |

D600

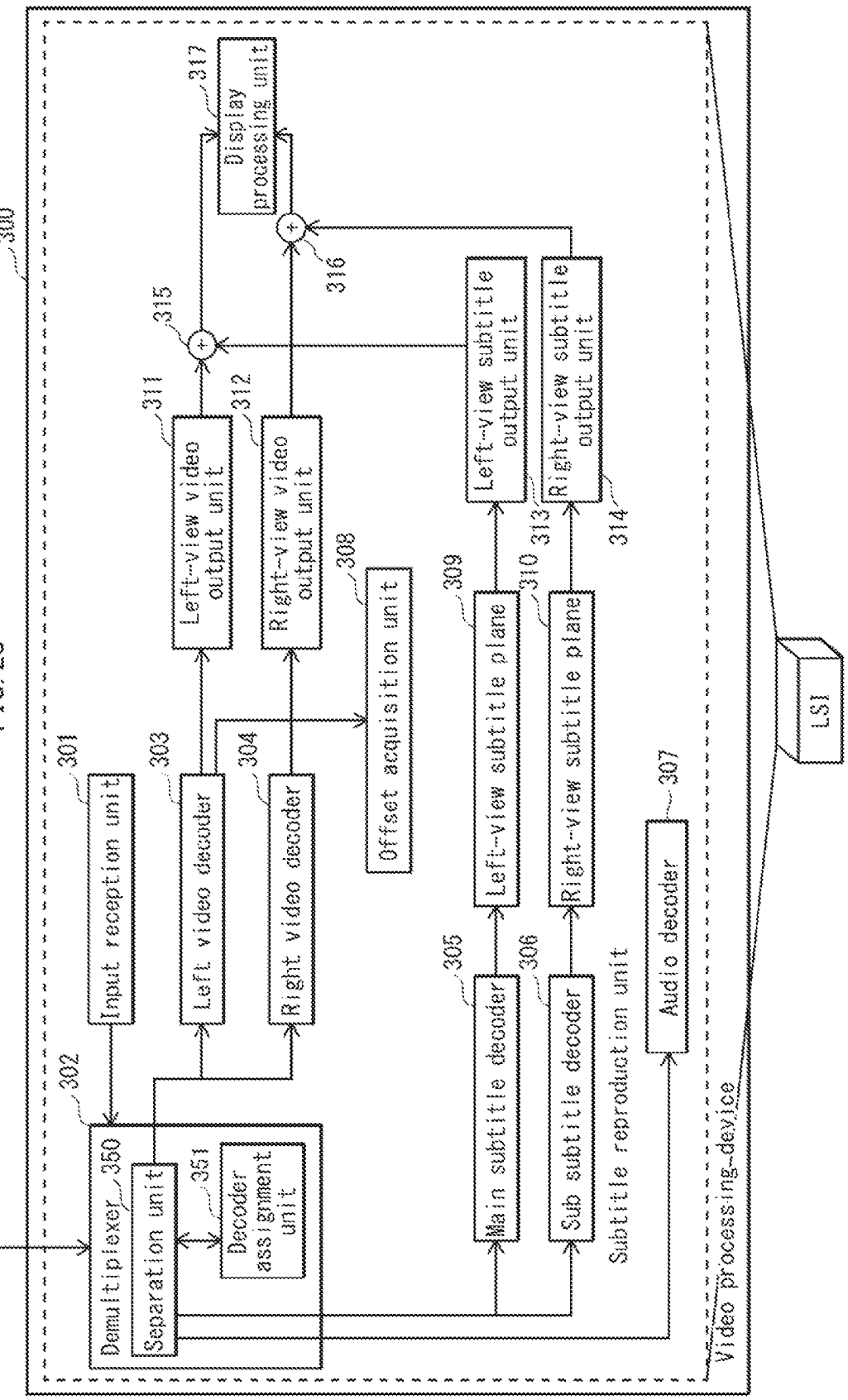

VIDEO PROCESSING DEVICE, TRANSMISSION DEVICE, VIDEO PROCESSING SYSTEM, VIDEO PROCESSING METHOD, TRANSMISSION METHOD, COMPUTER PROGRAM AND INTEGRATED CIRCUIT

This application claims benefit to the U.S. Provisional Application No. 61/492,057, filed On Jun. 1, 2011.

TECHNICAL FIELD

The present invention relates to technology for processing data of transport streams, and in particular to technology for processing data to be displayed together with 3D video images.

TECHNICAL FIELD

In recent 2D broadcasting (without a stereoscopic effect), subtitles and video images are distributed as separate elementary streams (ESs). Therefore, a reception device is able to select a language of subtitles to be displayed, and to determine whether to display or hide the subtitles. When determining to display subtitles, the reception device displays the selected subtitles together with 2D video images distributed by 2D broadcasting.

Similarly, in the case of a 3D video that viewers can see stereoscopically, it is necessary to select a language of subtitles, determine whether to display or hide the subtitles, and display the selected subtitles together with the 3D video when the subtitles are determined to be displayed.

CITATION LIST

Patent Literature

[Patent Literature 1]
   Japanese Patent Application Publication No. 2010-268432
[Patent Literature 2]
   Japanese Patent Application Publication No. 2010-263616

SUMMARY OF INVENTION

Technical Problem

In the case of 3D broadcasting, when a reception device attempts to select a language of subtitles and determine whether to display or hide the subtitles in the same manner as the case of 2D broadcasting, it is necessary to distribute 3D subtitles to be displayed as a separate ES from a 3D video.

In order to display 3D subtitles, the following methods are used, for example: a method of distributing planar subtitles as one ES, and reproducing subtitles for the left view (left-view subtitles) and subtitles for the right view (right-view subtitles) at a reception device based on the planar subtitles; and a method of distributing left-view subtitles and right-view subtitles as separate ESs, and reproducing the left-view subtitles and the right-view subtitles based on their respective ESs at a reception device.

As for distribution of a 3D video, a distributor takes into consideration the amount of data to be distributed, etc., for each 3D program to be distributed, and determines a distribution mode of distributing subtitles, such as: a distribution mode of distributing planar subtitles as one ES; and a distribution mode of distributing planar subtitles, left-view subtitles and right-view subtitles as separate ESs. A reception device (video processing device) that processes video images is able to identify a distribution mode of a subtitle ES by decoding the subtitle ES. However, when the reception device first decodes a subtitle ES to identify a distribution mode and then displays subtitles, the reception device cannot display the subtitles until completing the identification. Thus a delay occurs. Such a delay is problematic in distributing 3D video images by broadcasting.

The present invention has been achieved in view of the above problem, and an aim thereof is to provide a video processing device that quickly identifies a distribution mode of a stream of data to be displayed such as subtitles, and reproduces the data by using a processing method according to the identified distribution mode, and a transmission device, a video processing system, a video processing method, a transmission method, a computer program and an integrated circuit pertaining to the video processing device.

Solution to Problem

In order to solve the above problem, the present invention provides a video processing device that reproduces a 3D video while receiving a video stream of the 3D video, the video processing device comprising: a reception unit that receives a transport stream including additional information and a data stream of display data, the display data being to be displayed along with the 3D video, the additional information indicating whether the transport stream further includes a pair of a left-view data stream and a right-view data stream respectively generated from left-view data and right-view data used for displaying the display data; a determination unit that determines whether the transport stream includes the pair of the left-view data stream and the right-view data stream based on the additional information; and a display data reproduction unit that reproduces the left-view data and the right-view data respectively from the left-view data stream and the right-view data stream when the determination unit determines that the transport stream includes the pair of the left-view data stream and the right-view data stream, and reproduces alternative left-view data and right-view data, used for displaying the same display data from the data stream, when the determination unit determines that the transport stream does not include the pair of the left-view data stream and the right-view data stream.

Advantageous Effects of Invention

According to the above structure, since the video processing device uses additional information included in the transport stream to determine whether the transport stream includes the left-view data stream and the right-view data stream, the video processing device is able to quickly identify a distribution mode of a stream of the data to be displayed and quickly display the data in 3D according to the identified distribution mode.

BRIEF DESCRIPTION OF DRAWINGS

FIG. 1 shows an example of a 1-plane+offset mode.
FIG. 5 shows the data structure of an ES attribute list T100.

FIG. 7 shows an example of a 3D subtitle pair descriptor D200.

FIG. 8 is a schematic view showing part of the PMT describing the 3D subtitle pair descriptor D200.

FIGS. 13A and 13B show images to be distributed to achieve display of subtitles.

FIG. 15 shows the structure of a video processing system 100a.

FIG. 16 shows the structure of a video distribution device 200a.

FIG. 17 shows an example of a 3D subtitle descriptor D500.

FIG. 18 is a schematic view showing part of the PMT describing the 3D subtitle descriptor D500.

FIG. 19 shows the structure of a video processing device 300a.

FIG. 23 shows the structure of an LSI that achieves the functions of the video processing device 300.

DESCRIPTION OF EMBODIMENTS

Figure 2:
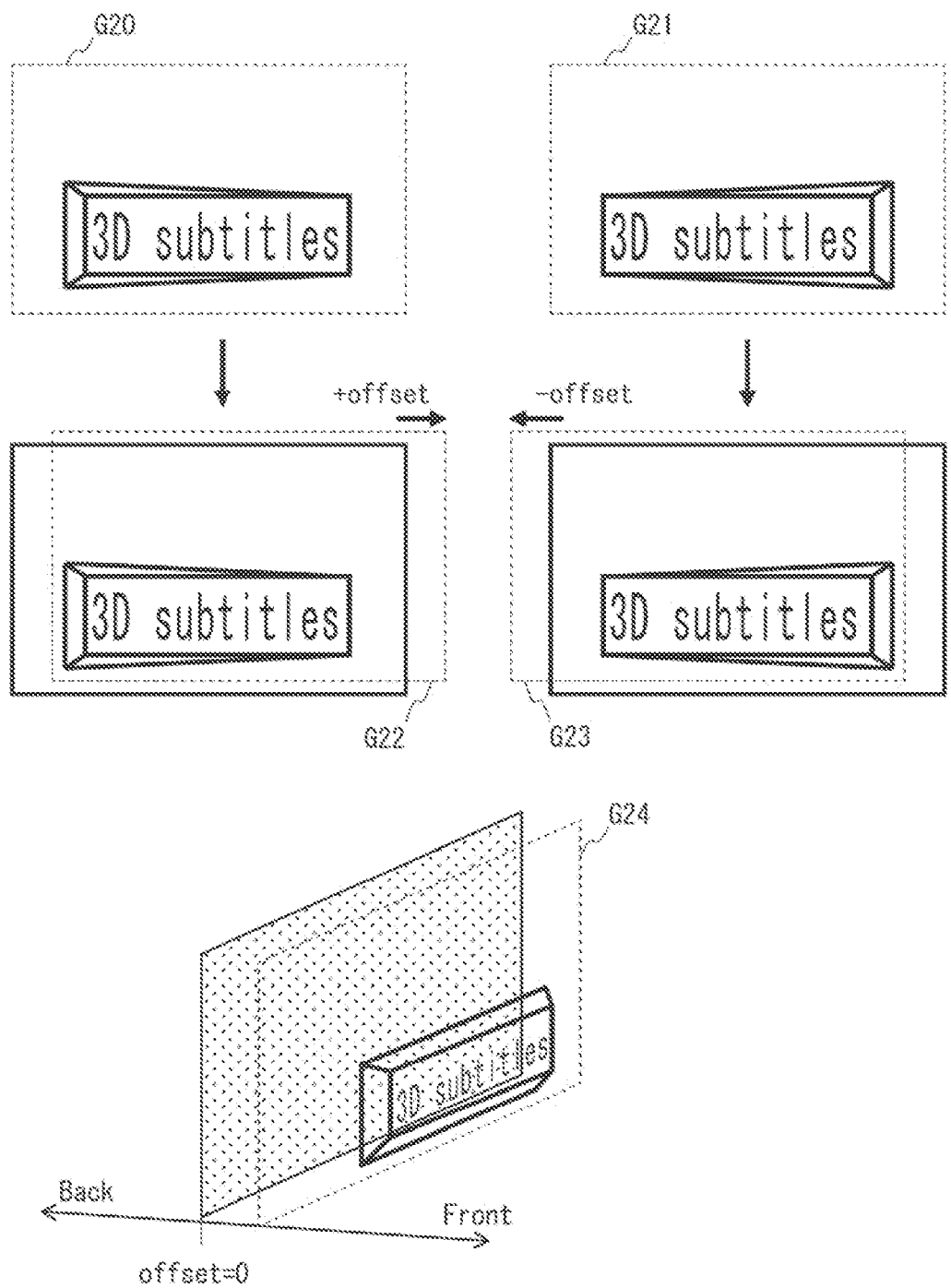
FIG. 2 shows an example of a 2-plane+offset mode.

1. Discovery Serving as a Basis for the Present Invention

Patent Literature 1 discloses a technology in which subtitle data for left-view and subtitle data for right-view are stored in a disc, and a video playback device separately reads the subtitle data for left-view and the subtitle data for right-view from the disc, reproduces the left-view subtitles and the right-view subtitles, and outputs the reproduced subtitles.

Patent Literature 2 discloses a technology in which a left-view video stream and a right-view video stream are separately prepared for video images, and a video playback device separately reproduces left-view video images and right-view video images from these streams. In this case, subtitles are prepared as one stream (ES), and the left-view subtitles and the right-view subtitles are reproduced from the subtitle ES.

According to Patent Literatures 1 and 2, video images and subtitles are assumed to be stored in a disc are reproduced and played back. Therefore, when the disc stores therein streams obtained from planar subtitles, left-view subtitles and right-view subtitles corresponding to video images to be played back, no problem occurs even if a playback apparatus analyzes these streams to determine which method is to be used in the processing of displaying subtitles. This is because one program has already been stored in the disc, and even if the playback apparatus analyzes a stream of subtitles and subsequently displays the subtitles, this does not delay display of subtitles.

However, in the case of a program distributed by broadcasting, video images and subtitles of the program are displayed while being received, and accordingly quick analysis of the video images, etc., is required.

The inventors of the present invention have focused on additional information that a video playback device refers to before processing of a stream of data to be displayed, such as subtitles, and have invented a video processing device that quickly identifies a distribution mode of a subtitle ES based on the additional information, and reproduces subtitles according to the identified distribution mode.

One aspect of the present invention provides a video processing device that reproduces a 3D video while receiving a video stream of the 3D video, the video processing device comprising: a reception unit that receives a transport stream including additional information and a data stream of display data, the display data being to be displayed along with the 3D video, the additional information indicating whether the transport stream further includes a pair of a left-view data stream and a right-view data stream respectively generated from left-view data and right-view data used for displaying the display data; a determination unit that determines whether the transport stream includes the pair of the left-view data stream and the right-view data stream based on the additional information; and a display data reproduction unit that reproduces the left-view data and the right-view data respectively from the left-view data stream and the right-view data stream when the determination unit determines that the transport stream includes the pair of the left-view data stream and the right-view data stream, and reproduces alternative left-view data and right-view data, used for displaying the same display data from the data stream, when the determination unit determines that the transport stream does not include the pair of the left-view data stream and the right-view data stream.

2. Embodiment 1

The following describes Embodiment 1 of the present invention in detail with reference to the drawings.

2.1 Stereoscopic Display of Subtitles

First, description is made on a technology of displaying subtitles in 3D. This technology serves as the basis for the present embodiment.

There are two modes for displaying subtitles in 3D. One of them is a 1-plane+offset mode, and the other of them is a 2-plane+offset mode.

FIG. 1 shows an example mechanism of the 1-plane+offset mode. In this mode, subtitles are generally distributed as one elementary stream (ES), and a video processing device, such as a digital television, decodes subtitle data and generates an image G10 for a subtitle plane. Subsequently, the video processing device generates an image G11 by shifting the image G10 to the right by an offset value (hereinafter, such an image is referred to as "left-view subtitle image") and overlays the left-view subtitle image G11 on a left-view video image. Also, the video processing device generates an image G12 by shifting the image G10 to the left by the offset value (hereinafter, such an image is referred to as "right-view subtitle image") and overlays the right-view subtitle image G12 on a right-view video image. When the video processing device sequentially displays left-view video images and right-view video images on which subtitle images are overlaid, the subtitle images are perceived as being closer to a viewer than the screen, and the 3D display is achieved. The offset value is for appropriately overlaying subtitles on 3D video images and represented as a number of pixels. Since the offset value needs to be synchronized with video images, the offset value is transmitted as a content of an ES of 3D video images. When the 3D video image data is encoded in moving picture experts group (MPEG) format, the offset value is embedded as user data in a GOP (group of pictures) or in each image frame, for example.

Note that when the offset value is negative, the left-view subtitle image is generated by shifting the image for the subtitle plane to the left, and the right-view subtitle image is generated by shifting the image for the subtitle plane to the right. In this case, the subtitle images appear to be positioned behind the screen.

The depth of a subtitle plane G13 can be set by setting the offset value for shifting the image for the subtitle plane.

In the 1-plane+offset mode, only one subtitle plane memory is needed, and accordingly the load on the video processing device for reproducing 3D subtitles is small. However, in this mode, a planar image simply appears to be positioned in front of the screen or behind the screen, and a text string itself such as subtitles and superimposed characters and an object itself in a bitmap are not stereoscopically displayed.

FIG. 2 shows an example structure of the 2-plane+offset mode. In this mode, although left-view subtitle data and right-view subtitle data may be distributed as one ES, the left-view subtitle data and the right-view subtitle data are generally distributed as two separate ESs. A reception device decodes the left-view subtitle data by a left-view subtitle decoder to generate an image G20 for a left-view subtitle plane, and decodes the right-view subtitle data by a right-view subtitle decoder to generate an image G21 for a right-view subtitle plane. Subsequently, the video processing device generates an image G22 by shifting the image G20 to the right by an offset value (hereinafter, such an image is referred to as "left-view subtitle image") and overlays the left-view subtitle image G22 on a left-view video image. Also, the video processing device generates an image G23 by shifting the image G21 to the left by the offset value (hereinafter, such as image is referred to as "a right-view subtitle image") and overlays the right-view subtitle image G23 on a right-view video image. When the video processing device sequentially displays the left-view video images and the right-view video images on which the subtitle images are overlaid, the subtitle images perceived as being closer to a viewer than the screen, and the 3D display is achieved.

Note that when the offset value is negative, the left-view subtitle image is generated by shifting the image for the left-view subtitle plane to the left, and the right-view subtitle image is generated by shifting the image for the right-view subtitle plane to the right. In this case, the subtitle image appears to be positioned behind the screen.

The depth of a subtitle plane G24 can thus be set by setting the offset value for shifting the images for the left-view subtitle plane and the right-view subtitle plane.

In the 2-plane+offset mode, a left-view subtitle image and a right-view subtitle image are generated from images for different subtitle planes, and thus a text string itself such as subtitles and superimposed characters or an object itself in a bitmap appears to be stereoscopic. In this case, however, two subtitle decoders and two subtitle plane memories are needed, and the processing load on the video processing device is large.

This completes the overview of the two modes for stereoscopically displaying 3D subtitles.

2.2 Video Processing System 100

Here, description is made on the overview of the video processing system 100 in the present embodiment.

Figure 3:
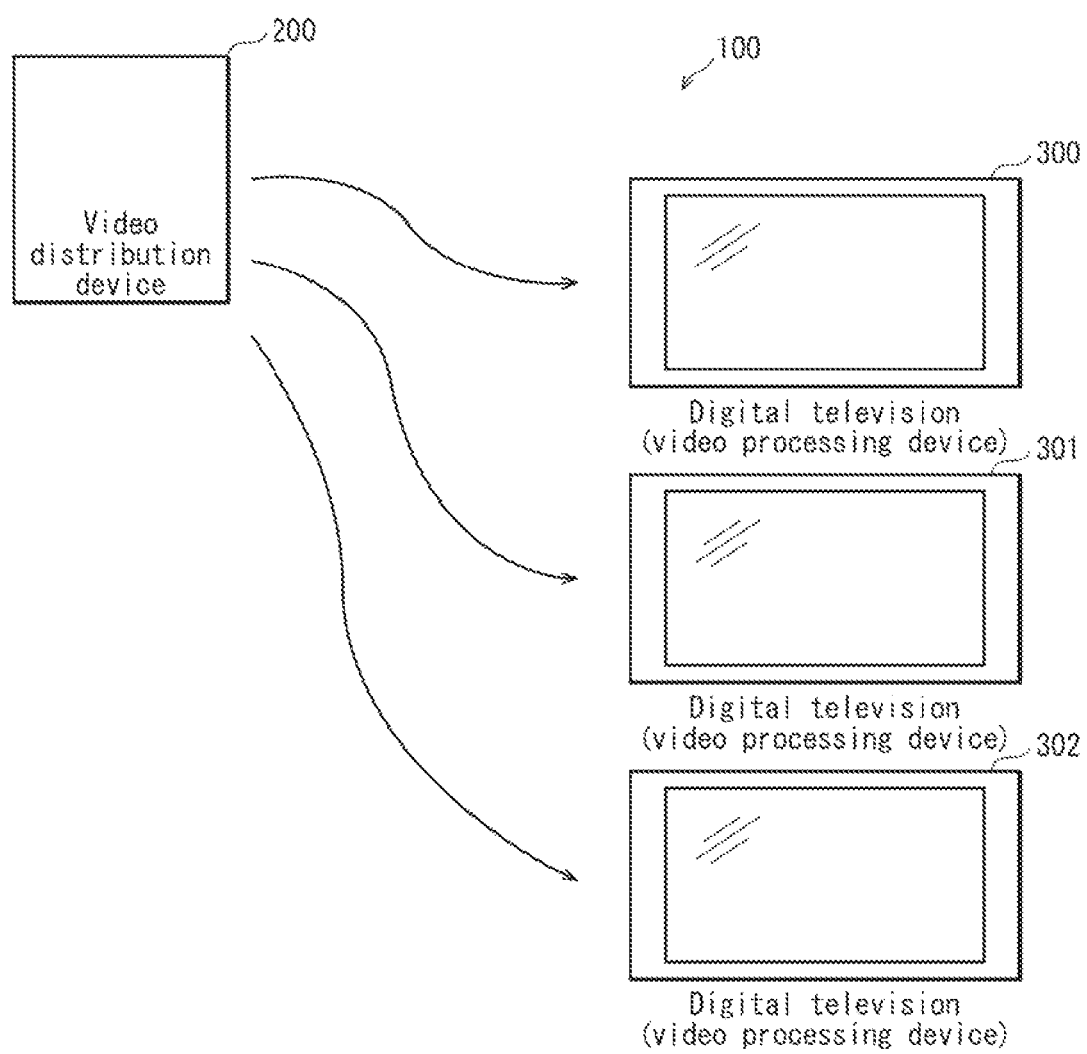
FIG. 3 shows the structure of a video processing system 100.

The video processing system 100 includes a video distribution device 200 and video processing devices 300, 301 and 302, as shown in FIG. 3.

The video distribution device 200 distributes video images, audio and subtitles of a program as a transport stream formed by encoding the video images, audio and subtitles of the program as a digital broadcast. A data deliverer distributes video images, audio and subtitles of a program with use of the video distribution device 200.

The video processing devices 300, 301 and 302 receive the transport stream distributed by the video distribution device 200, reproduce the video images, audio and subtitles of the program from the received transport stream, and display the video images and subtitles and play audio.

In order to support devices with various processing capabilities, the video distribution device 200 generates two or more subtitle sets, such as a 2D subtitle set, a 3D subtitle set that is to be distributed as one ES, and a 3D subtitle set that is to be distributed as two ESs, etc., and distributes the generated subtitle sets. The devices with various processing capabilities include a 2D video processing device that does not support 3D, a 3D video processing device that merely supports a mode of distributing subtitles as one ES, and a 3D video processing device that supports modes of distributing subtitles as one ES and two ESs, for example. Even though the generated subtitle sets appear differently to a user, i.e., perceived as being planar or stereoscopic to a viewer, the subtitle sets are subtitle data conveying the same content. Here, a 1ES mode is a distribution mode in which a stream obtained from planar subtitle video images is distributed to be displayed as 2D subtitles, and as 3D subtitles in the 1-plane+offset mode. In the 1ES mode, both the 2D subtitle set and the 3D subtitle set displayed in the 1-plane+offset mode can be distributed. A 2ES mode is a distribution mode in which an ES of left-view subtitles and an ES of right-view subtitles are distributed to be displayed as 3D subtitles in the 2-plane+offset mode. Note that hereinafter, a subtitle set is also referred to simply as subtitles.

Each of the video processing devices 300, 301 and 302 displays one subtitle set among a plurality of subtitle sets that corresponds to a processing capability thereof.

The video processing device 300 supports distribution of a subtitle ES in the 1ES and 2ES modes. The video processing device 301 supports only distribution of a subtitle ES in the 1ES mode. The video processing device 302 does not support 3D (i.e., displays 2D video images).

The present embodiment adopts the Service Information/Program Specific Information (SI/PSI) information specified by the MPEG2-TS standards.

SI is a collective term for tables in which information on a program is encoded in a format that the video processing device can interpret. The SI is specified by the Association of Radio Industries and Businesses (ARIB) and includes, for example, the Network Information Table (NIT) and the Event Information Table (EIT).

PSI is a collective term for tables in which information regarding the program to which each ES included in a TS belongs is encoded in a format that the video processing device can interpret. The PSI is specified by standards established by ISO/IEC13818-1 and the ARIB and includes, for example, tables such as a Program Association Table (PAT) and a Program Map Table (PMT).

2.3 Video Distribution Device 200

Figure 4:
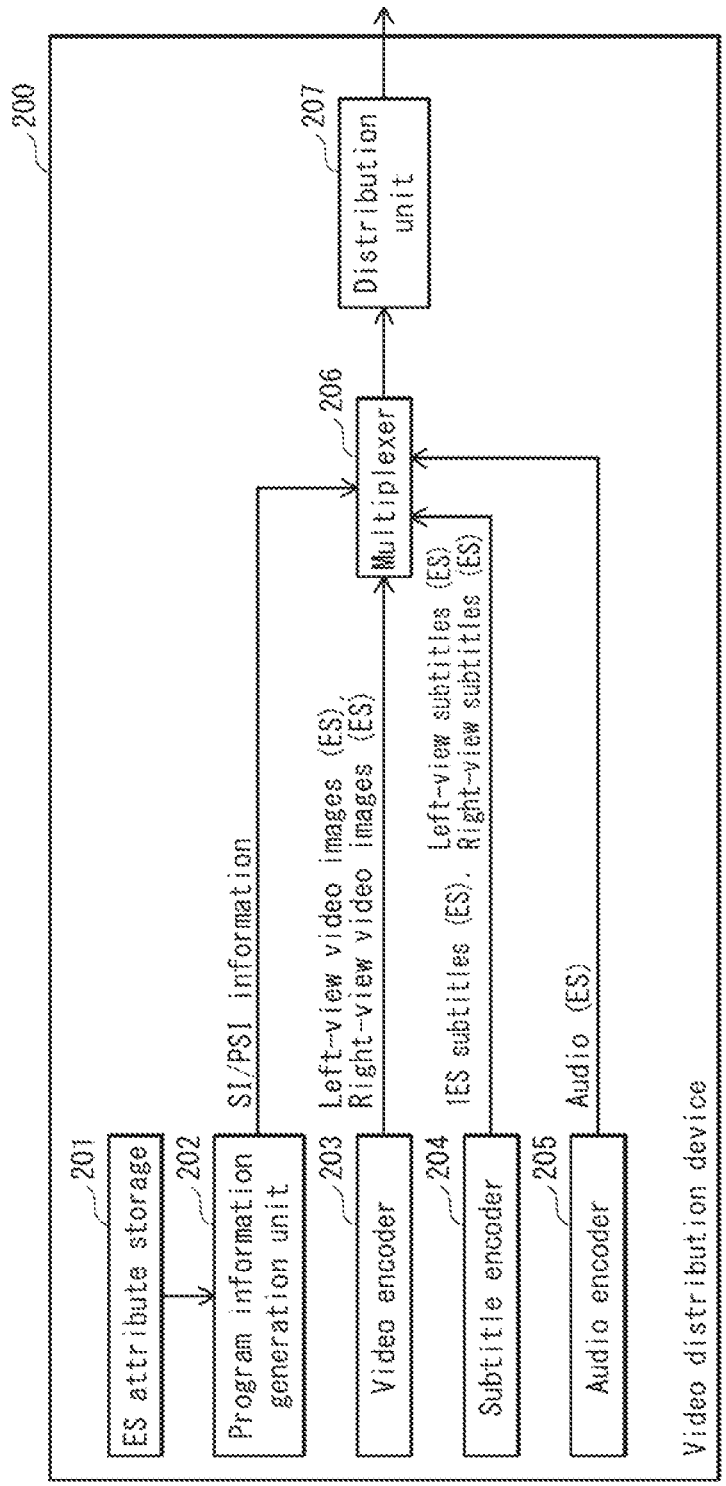
FIG. 4 shows the structure of a video distribution device 200.

The video distribution device 200 includes an ES attribute storage 201, a program information generation unit 202, a video encoder 203, a subtitle encoder 204, an audio encoder 205, a multiplexer 206 and a distribution unit 207, as shown in FIG. 4.

(1) ES Attribute Storage 201

The ES attribute storage 201 stores therein ES attribute, which is used by the program information generation unit 202 to generate the SI/PSI information.

To be specific, the ES attribute storage 201 stores an ES attribute list T100 shown in FIG. 5.

The ES attribute list T100 includes an area that stores a plurality of sets of ES name, stream_type, view, PID and component_tag. Each set represents an ES attribute.

The field of "ES name" stores a name for identifying each ES. Since it suffices if each ES can be identified, a number other than a name may be assigned to each ES for identification.

The field of "stream_type" stores information for identifying a type of each ES (video images, subtitles, audio, etc.). For example, operation provisions for ARIB specify that in a digital broadcast, a stream of video images is assigned "0x10" and a stream of subtitles is assigned "0x06". Accordingly, "stream_type" of a stream of each of left-view video images and right-view video images stores "0x10", and "stream_type" of a stream of each of left-view subtitles and right-view subtitles stores "0x06".

The field of "view" stores information for identifying whether each ES is for left-view or right-view. Here, "view" of left-view video images and subtitles stores "left", and "view" of right-view video images and subtitles stores "right". The 2D ES and the subtitle ES distributed in the 1ES mode are not divided into left and right, and "view" of each of these ESs stores information indicating that each ES is not divided into left and right. Here, such information is represented by "–".

The field of "PID" stores a value of a PID that is to be assigned to each ES, and to TS (Transport Stream) packets of each ES.

The field of "component_tag" stores a value of component_ ag that is to be assigned to each ES.

By way of example, the ES attribute T101 shown in FIG. 5 is composed of "left-view video images" in the field of "ES name", "0x10" in the field of "stream_type", "left" in the field of "view", and "0x0110" in the field of "PID". The PID "0x0110" indicates that this ES is a stream of left-view video images.

The ES attribute T102 shown in FIG. 5 has "1ES subtitles" in the field of "ES name", "0x06" in the field of "stream_ ype", "–" in the field of "view", and "0x0112" in the field of "PID". The PID "0x0112" indicates that this ES is a stream of 2D subtitles or 3D subtitles to be distributed as one ES.

Further, the ES attribute T103 has "left-view subtitles" in the field of "ES name", "0x06" in the field of "stream_type", "left" in the field of "view", and "0x0113" in the field of "PID". The PID "0x0113" indicates that this ES is a stream of left-view subtitles.

Although not shown in FIG. 5, the ES attribute list T100 stores ES attribute on an ES of audio (hereinafter, referred to as "audio ES"). The ES attribute storage 201 also stores various pieces of information such as information on programs so as to generate the SI/PSI information.

(2) Program Information Generation Unit 202

The program information generation unit 202 generates the SI/PSI information based on the information stored in the ES attribute storage 201, and outputs the generated SI/PSI information to the multiplexer 206.

Examples of the tables generated as the SI/PSI information include NIT, EIT, PAT and PMT.

Descriptors listed in the tables of the SI/PSI information and values of parameters vary by the structures of ESs composing a program. Therefore, the program information generation unit 202 may generate a plurality of pieces of the SI/PSI information corresponding to all of the ES structures before distributing video images, and may generate the SI/PSI information when distributing video images while taking the ES structure in consideration.

The program information generation unit 202 generates a PMT, which is a kind of SI/PSI information.

The following describes the PMT generated by the program information generation unit 202. The PMT stores information on a program to be distributed, the ES structure of the program, and information on each ES.

Figure 6:
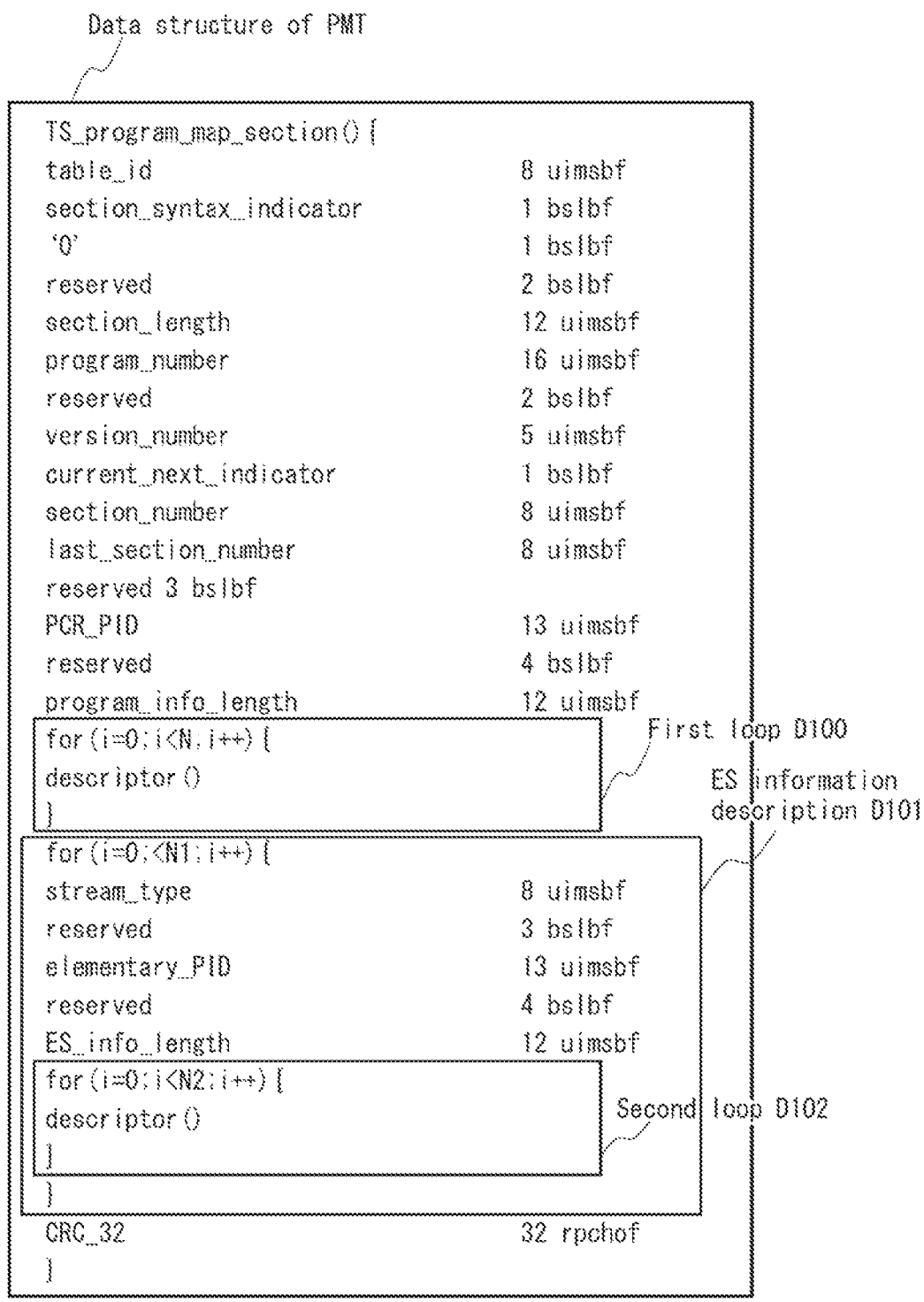
FIG. 6 shows the data structure of a PMT.

FIG. 6 shows the data structure of the PMT. A description of individual parameters can be found in ISO/IEC13818-1 (MPEG-2) and is therefore omitted here. Only the portion that is relevant to the present invention is described. In the PMT, there are two locations in which descriptors can be listed.

One of them is a first loop D100. A descriptor can be listed in "descriptor( )" of the first loop D100. The "descriptor( )" is within a for loop, and a plurality of descriptors can be inserted thereto. Here, descriptors that relate to information on the entire program are described.

The other location in which descriptors can be listed is a second loop D102 included in an ES information description D101. In the ES information description D101, a "for" loop starts immediately after the first loop D100. The number of iterations of the "for" loop in the ES information description D101 equals the number of ESs pertaining to the program. The parameters within the "for" loop such as stream_type and elementary_PID are parameters related to an ES corresponding to the "for" loop. The second loop D102 is included in the ES information description D101. A descriptor can be listed in "descriptor( )" of the second loop D102. The "descriptor( )" is within a for loop, and a plurality of descriptors can be inserted thereto. Here, descriptors that relate to the ES are described.

The elementary_PID in the ES information description D101 is information identifying each of the transport packets, which are the packets of the TS. The same elementary_PID is attached to the transport packets of the same video ES, the same subtitle ES, or the same SI/PSI table. The elementary_PID is also simply referred to as a PID.

For example, five pieces of ES information are described in the ES information description D101 when one program is composed of five ESs such as an ES of left-view video images (hereinafter, referred to as "left-view video ES"), an ES of right-view video images (hereinafter, referred to as "right-view video ES"), a subtitle ES distributed in the 1ES mode (hereinafter, referred to as "1ES-subtitle ES"), an ES of left-view subtitles (hereinafter, referred to as "left-view subtitle ES") and an ES of right-view subtitles (hereinafter, referred to as "right-view subtitle ES"). When information on a left-view subtitle ES is set to parameters such as stream_type and elementary_PID based on the ES attribute, descriptors on the left-view subtitle ES are described in the second loop D102.

FIG. 7 is a schematic view showing an example of a 3D subtitle pair descriptor (stereoscopic_subtitle_pair_descriptor) D200 described in the second loop D102 of the PMT by extending ISO/IEC13818-1 (MPEG-2) and the ARIB. The 3D subtitle pair descriptor D200 is described when information on the left-view subtitle ES or the right-view subtitle ES is set to parameters such as stream_type and elementary_PID in the ES information.

The 3D subtitle pair descriptor D200 consists of parameters, i.e., "descriptor_tag", "descriptor_length", "subtitle_ view", "reserved" and "pair_PID".

The parameter "descriptor_tag" informs a 3D video display device that a descriptor including this parameter is a 3D subtitle pair descriptor. The parameter "descriptor_tag" is assigned a fixed value. For example, "0x80" is assigned thereto.

The parameter "descriptor_length" indicates a byte length of data part of a descriptor that is immediately after this field. This parameter has a fixed length. Since a byte length of the following parameters is 2, the fixed length "2" is assigned thereto.

The parameter "subtitle_view" indicates whether an ES corresponding to the 3D subtitle pair descriptor D200 is a left-view subtitle ES or a right-view subtitle ES. In the case of the left-view subtitle ES, "subtitle_view" is assigned "0", and in the case of the right-view subtitle ES, "subtitle_view" is assigned "1".

The "reserved" is a location reserved for future extension, etc. Each of two bits of the "reserved" is assigned "1".

The parameter "pair_PID" indicates a PID of a subtitle ES that is to be paired with the ES. If the ES is a left-view subtitle ES, the parameter "pair_PID" is assigned a PID of a right-view subtitle ES, and if the ES is a right-view subtitle ES, the parameter "pair_PID" is assigned a PID of a left-view subtitle ES.

FIG. 8 is a schematic view showing part of the PMT that is generated by the program information generation unit 202 and is to be distributed to the video processing device. By describing specific information on all of the ESs constituting a program in the ES information description D101 in FIG. 6 showing the PMT data structure, an ES information description D300 is attained. Although there must normally be locations for "reserved" and "ES_info_length" before or after "elementary_PID" as shown in FIG. 6, these descriptions are omitted in each piece of ES information, i.e., D301, D304, D305, D306 and D307 shown in FIG. 8. The information on the left-view subtitle ES is described in the ES information D301 on the left-view subtitle ES. By describing specific information on the left-view subtitle ES in the 3D subtitle pair descriptor D200 shown in FIG. 6, ES information D302 for a left-view subtitle ES is attained. By describing specific information on a left-view subtitle ES in conventional "stream_identifier_descriptor", stream_identifier_descriptor D303 is attained. A description of individual parameters of the stream_identifier_descriptor D303 can be found in standards established by ISO/IEC13818-1 and the ARIB, and is therefore omitted here.

The stream_type in the ES information D301 on the left-view subtitles is assigned "0x06" indicated by "stream_type" included in the ES attribute T103 shown in FIG. 5. The Elementary_PID is assigned "0x0113" indicated by "PID" included in the ES attribute T103 shown in FIG. 5. The descriptor_tag is assigned "0x80", which is an ID of a descriptor. The descriptor_length is assigned "0x2", which is a byte length of the following parameters. When "left" is assigned to "view" in the ES attribute T103 shown in FIG. 5, subtitle_view is assigned the value "0x0". The "reserved" is assigned the fixed value "0x2". Since this ES is a left-view subtitle ES, the "pair_PID" is assigned "0x0114", which is the value of "Elementary_PID" of a right-view subtitle ES. The value of the Elementary_PID of a right-view subtitle ES is obtained from the ES attribute T104 of right-view subtitles. Since the stream_identifier_descriptor is a matter of conventional technology, a description thereof is omitted.

In the present embodiment, the 3D subtitle pair descriptor is described in the ES information of the subtitle ES. However, the present invention is not limited to this. The 3D subtitle pair descriptor may be described in ES information of an ES of text strings of superimposed characters and bitmaps.

In the ARIB standard, subtitles and superimposed characters can be displayed on the subtitle plane. Superimposed characters can therefore also be displayed stereoscopically by the same processing as subtitles. When superimposed characters are stereoscopically displayed, an ES of superimposed characters in the 2ES mode and the PMT including a descriptor that is the same as the 3D subtitle pair descriptor in the ES information of the superimposed characters are distributed to the reception device, and the reception device is able to display, in the 2-plane+offset mode, the superimposed characters distributed in the 2ES mode in 3D.

(3) Video Encoder 203

The video encoder 203 generates a left-view video ES and a right-view video ES based on video images filmed by a video camera, etc., using a standard such as MPEG-2 and MPEG-4 AVC, and outputs the left-view video ES and the right-view video ES to the multiplexer 206.

Each of pictures included in the left-view video ES is assigned an offset value for subtitles.

(4) Subtitle Encoder 204

The subtitle encoder 204 encodes subtitles using a standard such as MPEG-1 and MPEG-2, generates a subtitle ES that is to be distributed in the 1ES mode, a left-view subtitle ES, a right-view subtitle ES, etc., and outputs the generated subtitle ESs to the multiplexer 206.

(5) Audio Encoder 205

The audio encoder 205 compresses and encodes audio data using a standard such as Linear PCM, generates an audio ES, and outputs the generated audio ES to the multiplexer 206.

(6) Multiplexer 206

The multiplexer 206 converts the SI/PSI information, the left-view video ES, the right-view video ES, the subtitle ES that is to be distributed in the 1ES mode, the left-view subtitle ES and the right-view subtitle ES into packets as necessary, and multiplexes the packets. Subsequently, the multiplexer 206 generates one or more transport streams (TSs) in MPEG2-TS format, and outputs the generated TSs to the distribution unit 207. When a TS is generated, assignment of a PID to each packet follows the descriptions of the SI/PSI information.

(7) Distribution Unit 207

The distribution unit 207 distributes the one or more TSs generated by the multiplexer 206 to one or more video display devices as a digital broadcast by broadcast, by CDN and through open interne network.

Figure 9:
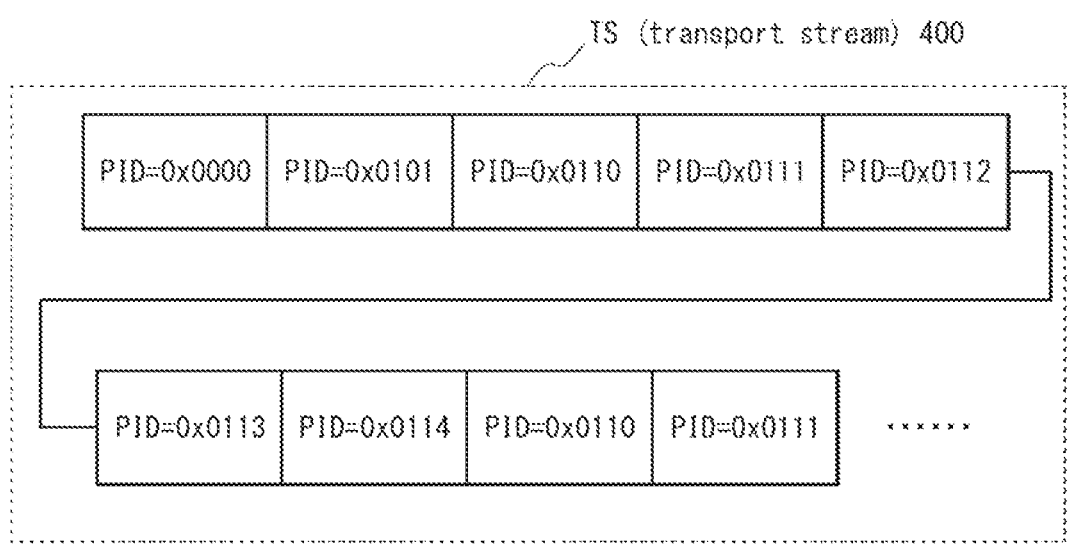
FIG. 9 is a schematic view showing the structure of a transport stream (TS) 400.

FIG. 9 is a schematic view showing the structure of a TS400 that is generated by the multiplexer 206 and is to be distributed by the distribution unit 207. The TS400 consists of sequential packets each having 188 bytes. Such packets are referred to as transport packets. Each transport packet includes a PID. Each PID identifies a corresponding transport packet. The same PID is attached to the transport packets of the same video ES, the same subtitle ES, or the same SI/PSI table. Therefore, a device that has received the TS400 is able to, for example, separate the TS400 into ESs, and extract the SI/PSI table. The TS400 includes ESs having the PID values "0x000", "0x101", "0x110", "0x111", "0x112", "0x113", and "0x114".

2.4 Structure of Video Processing Device 300

Figure 10:
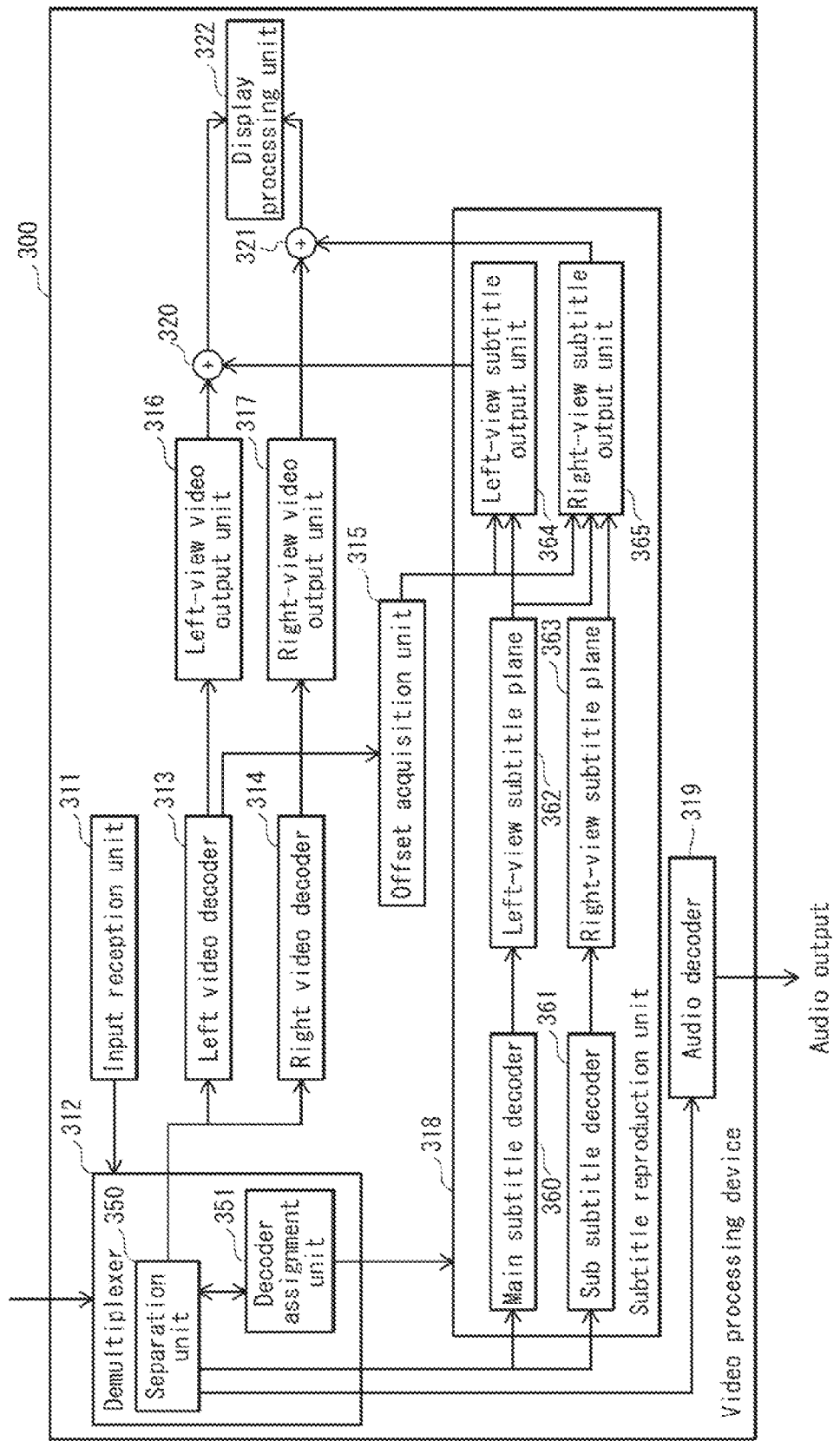
FIG. 10 shows the structure of a video processing device 300.

The video processing device 300 is a digital television that receives a digital broadcast from the video distribution device 200, and achieves stereoscopic viewing by displaying video images together with subtitles. As shown in FIG. 10, the video processing device 300 includes an input reception unit 311, a demultiplexer 312, a left video decoder 313, a right video decoder 314, an offset acquisition unit 315, a left-view video output unit 316, a right-view video output unit 317, a subtitle reproduction unit 318, an audio decoder 319, a superimposition units 320 and 321, and a display processing unit 322.

The subtitle reproduction unit 318 includes a main subtitle decoder 360, a sub subtitle decoder 361, a left-view subtitle plane 362, a right-view subtitle plane 363, a left-view subtitle output unit 364 and a right-view subtitle output unit 365, as shown in FIG. 10.

(1) Input Reception Unit 311

The input reception unit 311 receives a user input such as channel switching, 2D/3D switching, and ON/OFF switching of subtitles, and informs the demultiplexer 312 of a packet that is to be acquired, according to the user input.

(2) Demultiplexer 312

The demultiplexer 312 receives a transport stream distributed from the video distribution device 200, demultiplexes the transport stream into right-view video packets, audio packets, subtitle packets, etc., and outputs the packets to their respective decoders.

The demultiplexer 312 includes a separation unit 350 and a decoder assignment unit 351, as shown in FIG. 10.

(2-1) Separation Unit 350

The Separation unit 350 receives a transport stream (TS) distributed from the video distribution device 200.

Based on a user instruction received by the input reception unit 311, the Separation unit 350 acquires only various tables in the SI/PSI, video packets, audio packets and subtitle packets relative to a program selected by a user from TS400.

The separation unit 350 outputs the acquired SI/PSI information such as PAT and PMT to the decoder assignment unit 351 such that the decoder assignment unit 351 identifies to which decoder each packet is to be output.

The separation unit 350 outputs each packet to a suitable decoder according to an instruction from the decoder assignment unit 351. To be specific, when receiving a packet of left-view video images, the separation unit 350 outputs the packet to the left video decoder 313, and when receiving a packet of right-view video images, the separation unit 350 outputs the packet to the right video decoder 314. The separation unit 350 outputs the received audio packet to the audio decoder 319. The separation unit 350 outputs the received subtitle packet to one of the main subtitle decoder 360 or the sub subtitle decoder 361 according to the instruction from the decoder assignment unit 351.

(2-2) Decoder Assignment Unit 351

The decoder assignment unit 351 analyzes the SI/PSI information such as PAT and PMT, and identifies to which decoder each packet is to be output.

Since video packets and audio packets are a matter of conventional technology, a description thereof is omitted.

Here, description is made on identification of a decoder to which a subtitle packet is to be output.

The decoder assignment unit 351 refers to various pieces of table information of the SI/PSI information relative to a program selected by a user, e.g., a PMT, and identifies a decoder to which packets of a plurality of subtitle ESs are to be output. That is, the decoder assignment unit 351 appropriately assigns the packets of the subtitle ESs to the main subtitle decoder and the sub subtitle decoder. When it is determined that a subtitle ES does not need to be assigned to any decoder, the subtitle ES is assigned to neither the main subtitle decoder nor the sub subtitle decoder. This prohibits the subtitle ES from being output to the decoders by the separation unit 350. For example, the decoder assignment unit 351 assigns packets of the left-view subtitle ES distributed in the 2ES mode, to the main subtitle decoder 360 and assigns packets of the right-view subtitle ES to the sub subtitle decoder 361.

The decoder assignment unit 351 notifies the subtitle reproduction unit 318 whether the subtitles are distributed in the 1ES mode or the subtitles are distributed in the 2ES mode, as the analysis result of the SI/PSI information.

(3) Left Video Decoder 313, Right Video Decoder 314

The left video decoder 313 decodes packets of left-view video images, and outputs the results of decoding the video packets, i.e., left-view video images, to the left-view video output unit 316.

The right video decoder 314 decodes packets of right-view video images, and outputs the results of decoding the video packets, i.e., right-view video images, to the right-view video output unit 317.

Since the operations of the video decoders decoding packets are a matter of conventional technology, a description thereof is omitted.

(4) Offset Acquisition Unit 315

The offset acquisition unit 315 acquires, from video packets, an offset value for setting the depth of subtitles, and outputs the offset value to the left-view subtitle output unit 364 and the right-view subtitle output unit 365.

(5) Left-View Video Output Unit 316, Right-View Video Output Unit 317

The left-view video output unit 316 outputs the left-view video images (left view) received from the left video decoder 313 to the superimposition unit 320 at constant intervals.

The right-view video output unit 317 outputs the right-view video images (right view) received from the right video decoder 314 to the superimposition unit 321 at constant intervals.

(6) Subtitle Reproduction Unit 318

The subtitle reproduction unit 318 reproduces 3D subtitles distributed in the 1ES mode or 3D subtitles (left-view subtitles and right-view subtitles) distributed in the 2ES mode, in response to the analysis result by the decoder assignment unit 351. The following describes components of the subtitle reproduction unit 318, i.e., the main subtitle decoder 360, the sub subtitle decoder 361, the left-view subtitle plane 362, the right-view subtitle plane 363, the left-view subtitle output unit 364 and the right-view subtitle output unit 365.

(6-1) Main Subtitle Decoder 360, Sub Subtitle Decoder 361

The main subtitle decoder 360 and the sub subtitle decoder 361 decode subtitle packets received from the separation unit 350, and write the results of decoding the subtitle packets, i.e., images of subtitles, in their respective planes.

To be specific, when receiving the notification that the subtitles are distributed in the 2ES mode from the decoder assignment unit 351, the main subtitle decoder 360 decodes packets of left-view subtitles included in the subtitles distributed in the 2ES mode, and stores the decoding result, i.e., images of left-view subtitles in the left-view subtitle plane 362.

When receiving the notification that the subtitles are distributed in the 1ES mode from the decoder assignment unit 351, the main subtitle decoder 360 decodes packets of subtitles distributed in the 1ES mode, and stores the decoding result, i.e., images of subtitles, in the left-view subtitle plane 362 and the right-view subtitle plane 363.

The sub subtitle decoder 361 decides packets of the right-view subtitles of the subtitles distributed as 2ES, and stores the decoding result, i.e., images of right-view subtitles in the right-view subtitle plane 363.

(6-2) Left-View Subtitle Plane 362, Right-View Subtitle Plane 363

The left-view subtitle plane 362 is a memory for storing one screen of pixel data, which has been reproduced by the main subtitle decoder 360, in units of lines so that the pixel data is output in accordance with the horizontal and vertical sync signals.

The right-view subtitle plane 363 is a memory for storing one screen of pixel data, which has been reproduced by the main subtitle decoder 360 or the sub subtitle decoder 361, in units of lines so that the pixel data is output in accordance with the horizontal and vertical sync signals.

(6-3) Left-View Subtitle Output Unit 364, Right-View Subtitle Output Unit 365

The left-view subtitle output unit 364 reproduces left-view subtitle images based on images of the subtitles stored in the left-view subtitle plane 362, and outputs the left-view subtitle images to the superimposition unit 320 at constant intervals. The constant intervals are, for example, equivalent to the intervals during which the left-view video output unit 316 outputs the left-view video images.

When receiving the notification that the subtitles are distributed in the 1ES mode from the decoder assignment unit 351, the right subtitle output unit 365 reproduces right-view subtitle images based on the images of the subtitles for the left-view subtitle plane 362, and outputs the right-view subtitle images to the superimposition unit 321 at constant intervals. When receiving the notification that the subtitles are distributed in the 2ES mode from the decoder assignment unit 351, the right subtitle output unit 365 reproduces right-view subtitle images based on the images of the subtitles for the right-view subtitle plane 363, and outputs the right-view subtitle images to the superimposition unit 321 at constant intervals. The constant intervals are, for example, equivalent to the intervals during which the right-view video output unit 317 outputs right-view video images.

To be specific, the left-view subtitle output unit 364 reproduces the left-view subtitle images by adding the offset value received from the offset acquisition unit 315 to the horizontal coordinate of the left-view subtitle plane 362.

When the subtitles are distributed in the 1ES mode, the right-view subtitle output unit 365 reproduces video images of the right-view subtitles by subtracting the offset value received from the offset acquisition unit 315 from the horizontal coordinate of the left-view subtitle plane 362. When the subtiles are distributed in the 2ES mode, the right-view subtitle output unit 365 reproduces video images of the right-view subtitles by subtracting the offset value received from the offset acquisition unit 315 from the horizontal coordinate of the right-view subtitle plane 363.

(7) Audio Decoder 319

The audio decoder 319 decodes audio packet received from the separation unit 350, and reproduces audio data. The audio decoder 319 subsequently outputs the audio data as audio.

(8) Superimposition Units 320, 321

The superimposition unit 320 superimposes the left-view subtitle images on the left-view video images, and outputs the left-view video images with the left-view subtitle images.

The superimposition unit 321 superimposes the right-view subtitle images on the right-view video images, and outputs the right-view video images with the right-view subtitle images.

(9) Display Processing Unit 322

The display processing unit 322 repeats displaying, on a screen (unillustrated), the left-view video images on which the left-view subtitle images reproduced by the superimposition unit 320 are superimposed and the right-view video images on which the right-view subtitle images reproduced by the superimposition unit 321 are superimposed alternately.

2.5 Operations (1) Operations of Video Distribution Device 200

Figure 11:
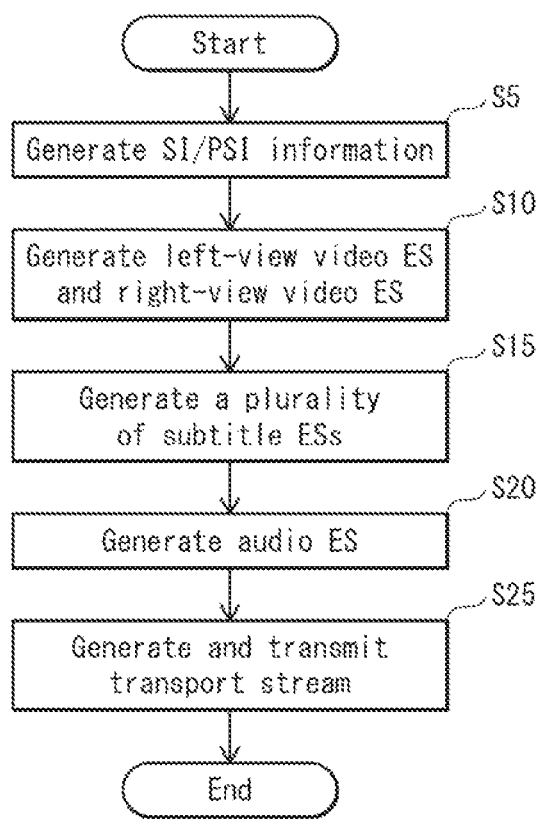
FIG. 11 is a flowchart showing distribution processing performed by the video distribution device 200.

The following describes the operations of the video distribution device 200 with reference to the flowchart shown in FIG. 11.

The program information generation unit 202 generates the SI/PSI information based on information stored in the ES attribute storage 201 (step S5).

The Video encoder 203 encodes each of the left-view video images and the right-view video images, and generates a left-view video ES and a right-view video ES (step S10).

The subtitle encoder 204 generates a plurality of subtitle ESs. To be specific, the subtitle encoder 204 generates a subtitle ES to be distributed in the 1ES mode, a left-view subtitle ES, and a right-view subtitle ES (step S15).

The audio encoder 205 compresses and encodes audio data, and generates an audio ES (step S20).

The multiplexer 206 multiplexes the SI/PSI information, the left-view video ES and the right-view video ES, the plurality of subtitle ESs, and the audio ES to generate a transport stream in MPEG2-TS format, and outputs the transport stream to the outside via the distribution unit 207 (step S25).

(2) Operations of Video Processing Device 300

Figure 12:
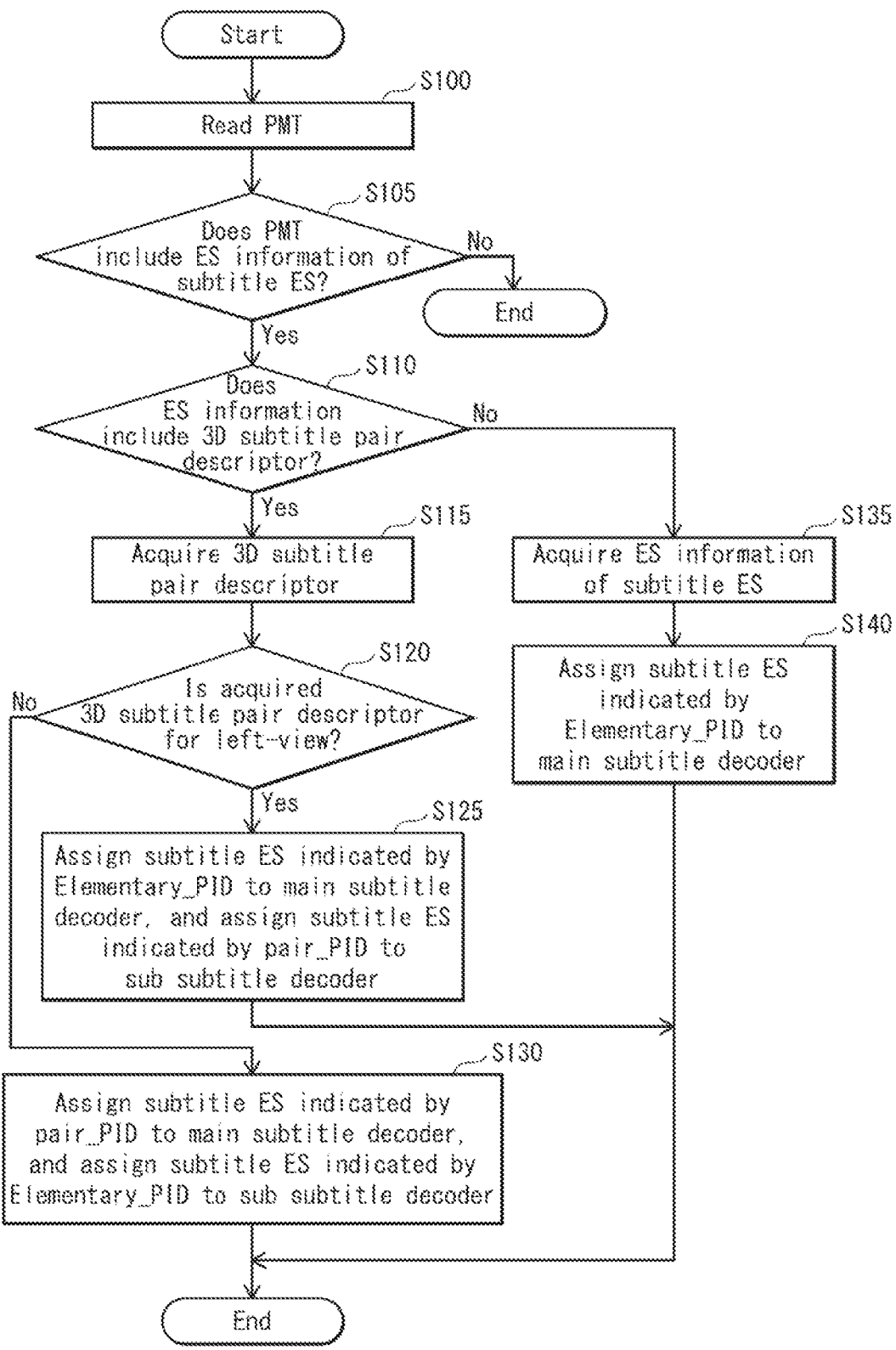
FIG. 12 is a flowchart showing the operation of a decoder assignment unit 351.

The following describes the operations of the video processing device 300, and in particular the operations of the decoder assignment unit 351 assigning decoders to the subtitle ESs, with reference to the flowchart shown in FIG. 12.

The decoder assignment unit 351 reads a PMT included in the SI/PSI information relative to a program selected by a user (step S100).

The decoder assignment unit 351 determines whether the read PMT includes ES information of subtitle ESs (step S105). To be specific, the decoder assignment unit 351 determines whether subtitle ESs is included based on values of parameters such as stream_type and component_tag. For example, operation provisions for ARIB specify in "OPERATIONAL GUIDELINES FOR DIGITAL SATELLITE BROADCASTING. ARIB TECHNICAL REPORT" that in a digital broadcast, stream_type of subtitles and superimposed characters is assigned "0x06", component_tag of subtitles is assigned "0x30"-"0x37", and component_tag of superimposed characters is assigned "0x39"-"0x3F".

When it is determined that the PMT includes the ES information of the subtitle ESs ("Yes" in step S105), the decoder assignment unit 351 determines whether the ES information of the subtitle ESs includes a 3D subtitle pair descriptor (stereoscopic_subtitle_pair_descriptor) (step S110).

When it is determined that the ES information of the subtitle ESs includes the 3D subtitle pair descriptor ("Yes" in step S110), the decoder assignment unit 351 acquires the 3D subtitle pair descriptor included in the ES information (step S115).

The decoder assignment unit 351 determines whether the acquired 3D subtitle pair descriptor is for left-view (step S120). To be specific, the decoder assignment unit 351 determines whether a value of "subtitle_view" included in the acquired 3D subtitle pair descriptor is "0x0".

When it is determined that the acquired 3D subtitle pair descriptor is for left-view ("Yes" in step S120), the decoder assignment unit 351 designates the sub subtitle decoder 361 as the output destination of packets of a subtitle ES having a PID indicated by "elementary_PID" included in the ES information of the subtitle ESs, and designates the main subtitle decoder 360 as the output destination of packets of s subtitle ES having a PID indicated by "pair_PID" included in the 3D subtitle pair descriptor (step S125).

When it is determined that the acquired 3D subtitle pair descriptor is not for left-view ("No" in step S120), i.e., when it is determined that the acquired 3D subtitle pair descriptor is for right-view, the decoder assignment unit 351 designates the sub subtitle decoder 361 as the output destination of packets of a subtitle ES having a PID indicated by "pair_PID" included in the 3D subtitle pair descriptor, and designates the main subtitle decoder 360 as the output destination packets of a subtitle ES having a PID indicated by the "elementary_PID" included in the ES information of the subtitle ESs (step S130).

When it is determined that the information on the subtitle ESs does not include the 3D subtitle pair descriptor ("No" in step S110), the decoder assignment unit 351 acquires the ES information of the subtitle ESs (step S135). The decoder assignment unit 351 designates the main subtitle decoder 360 as the output destination of the packets of a subtitle ES having a PID indicated by the "elementary_PID" included in the ES information of the subtitle ESs (step S140). In this case, the sub subtitle decoder 361 needs not perform decoding.

When it is determined that the PMT does not include the ES information of the subtitle ESs ("No" in step S105), the decoder assignment unit 351 ends the processing, i.e., ends processing of assigning packets of the subtitle ESs to decoders.

When the subtitles are distributed in the 2ES mode, i.e., when the left-view subtitle ES and the right-view subtitle ES are independently distributed, the decoder assignment unit 351 assigns the left-view subtitle ES and the right-view subtitle ES to the main subtitle decoder 360 and the sub subtitle decoder 361, respectively. Therefore, when the subtitles are distributed in the 2ES mode, the video processing device 300 is able to display subtitle images in the 2-plane+offset mode, i.e., high-quality subtitle images.

2.6 Specific Example

The following is a supplementary explanation regarding subtitle display through a specific example.

FIGS. 13A and 13B show images to be distributed so as to display subtitles. FIG. 13A shows a planar subtitle image G100, which is subtitle data distributed in the 1ES mode.

FIG. 13B shows a subtitle image G101 of an object representing subtitles that are seen from the left side thereof. The image G101 is distributed as left-view subtitle data. FIG. 13B shows a subtitle image G102 of the same object seen from the right side thereof. G102 is distributed as right-view subtitle data.

The following describes the process in which the image G100 is distributed in the 1ES mode as subtitles and the images G101 and G102 are distributed in the 2ES mode as subtitles by the video distribution device 200 and the subtitles are displayed by the video processing device 300.

The subtitle encoder 204 generates one ES from the image G100, a left-view subtitle ES from the image G101, and a right-view subtitle ES from the image G102. Since the data structure of subtitles is a matter of conventional technology, a description thereof is omitted.

The video encoder 203 generates a left-view video ES and a right-view video ES. The audio encoder 205 generates an audio ES.

The program information generation unit 202 generates the SI/PSI information. In the ES information description D101 shown in FIG. 6 included in the PMT generated at this time, ES information of the left-view subtitle ES is described in the ES information D301, ES information of the right-view subtitle ES is described in the ES information D304, ES information of the left-view video ES is described in the ES information D305, ES information of the right-view video ES is described in the ES information D306, and ES information of the subtitles to be distributed in the 1ES mode is described in the ES information D307.

The multiplexer 206 multiplexes the SI/PSI information, the left-view video ES, the right-view video ES, the 3D subtitles to be distributed in the 1ES mode, the left-view subtitle ES and the right-view subtitle ES to generate the TS400 shown in FIG. 9. The distribution unit 207 distributes the TS400 to the video processing device 300.

The video processing device 300 receives, from the input reception unit 311, designation of a program from a user. The decoder assignment unit 351 of the demultiplexer 312 acquires the PMT of the program designated by the user, and acquires PIDs of a left-view video, a right-view video and audio of the program designated by the user by using the acquired PMT. The decoder assignment unit 351 determines whether the TS400 includes a left-view subtitle ES and a right-view subtitle ES separately. In this case, since the S400 includes the left-view subtitle ES and the right-view subtitle ES separately, the decoder assignment unit 351 assigns packets of the left-view subtitle ES to the main subtitle decoder 360 and packets of the right-view subtitle ES to the sub subtitle decoder 361.

The separation unit 350 acquires, from among ESs of the program designated by the user from the received TS400, packets of the left-view video ES to output to the left video decoder 313, acquires packets of the right-view video ES to output to the right video decoder 314, and acquires packets of the audio ES to output to the audio decoder 319.

Further, the separation unit 350 acquires, from among the ESs of the selected program, packets of the left-view subtitle ES to output to the main subtitle decoder 360, and acquires packets of the right-view subtitle ES to output to the sub subtitle decoder 361.

The left video decoder 313 decodes packets of a left-view video ES to reproduce left-view video images, and outputs the left-view video images to the left-view video output unit 316. The right video decoder 314 decodes packets of a right-view video ES to reproduce right-view video images, and outputs the right-view video images to the right-view video output unit 317. The offset acquisition unit 315 acquires offset information from the packets of the left-view video ES, and outputs the offset information to the left-view subtitle output unit 364 and the right-view subtitle output unit 365.

The audio decoder 319 decodes packets of the audio ES to reproduce audio data, and outputs the audio data as audio.

The main subtitle decoder 360 decodes packets of the left-view subtitles (TS packets with the PID "0x0113") to reproduce the left-view subtitle image G101, and stores the image G101 in the left-view subtitle plane 362. The sub subtitle decoder 361 decodes packets of the right-view subtitles (TS packets with the PID "0x0114") to reproduce the right-view subtitle image G102, and stores the image G102 in the right-view subtitle plane 363.

The left-view subtitle output unit 364 adds the offset value received from the offset acquisition unit 315 to the horizontal coordinate of the image G101 of the left-view subtitles stored in the left-view subtitle plane 362, and outputs the image with the offset as the left-view subtitle image G22 shown in FIG. 2 at constant intervals.

The right-view subtitle output unit 365 subtracts the offset value received from the offset acquisition unit 315 from the horizontal coordinate of the image G102 of the right-view subtitles stored in the right-view subtitle plane 363, and outputs the image with the offset as the right-view subtitle image G23 shown in FIG. 2 at constant intervals.

The display processing unit 322 repeatedly alternates between performing operations to display the left-view video images on which left-view subtitle images reproduced by the superimposition unit 320 are superimposed on a screen, and performing operations to display the right-view video on which right-view subtitle images reproduced by the superimposition unit 321 are superimposed on the screen. As a result, a subtitle image G24 shown in FIG. 2 is displayed.

As described above, subtitles superimposed on video images (left-view video images/right-view video images) intended by the deliverer are displayed when the video distribution device 200 defines a new descriptor, i.e., the 3D subtitle pair descriptor (stereoscopic_subtitle_pair_descriptor), in the PMT and distributes the PMT as the ES information of the subtitle ES in the 2ES mode, and the video processing device 300 analyzes the PMT by using the decoder assignment unit 351 to assign packets of the left-view subtitle ES to the main subtitle decoder 360 and assign packets of the right-view subtitle ES to the sub subtitle decoder 361.

2.7 Video Processing Device 301 and Video Processing Device 302

The following briefly describes subtitle display performed by the video processing device 301 and the video processing device 302.

The video processing device 301 is not capable of stereoscopically displaying subtitles using a 3D subtitle set distributed in the 2ES mode. The video processing device 301 stereoscopically displays subtitles in the 1-plane+offset mode using a subtitle set distributed in the 1ES mode.

The video processing device 302 is not capable of stereoscopically displaying subtitles. Therefore, the video processing device 302 displays 2D subtitles using a subtitle set distributed in the 1ES mode. That is, the video processing device 302 displays video images on which images of planar subtitles acquired by decoding are superimposed. Alternatively, any one of the left-view subtitles and the right-view subtitles of the subtitles distributed in the 2ES mode may be displayed as 2D subtitles.

Further, since the video processing device 302 displays only 2D video images, when receiving left-view video images and right-view video images, the video processing device 302 may use only any one of the left-view video and the right-view video to display video images in 2D.

2.8 Modifications

In the above embodiment, the video distribution device 200 generates a transport stream always containing both a subtitle set distributed in the 1ES mode and a subtitle set distributed in the 2ES mode. However, the present invention is not limited to this.

The video distribution device 200 may vary a subtitle set to be distributed according to processing capability of a video display device, which is a distribution destination.

In this case, the video processing devices 300, 301 and 302 of the video processing system 100 transmit their respective processing capabilities. For example, with a request for distribution, the video processing device 300 transmits a notification that the video processing device 300 is able to display subtitles in the 2-plane+offset mode, the video processing device 301 transmits a notification that the video processing device 301 is able to display subtitles in the 1-plane+offset mode, and the video processing device 302 transmits a notification that the video processing device 302 is able to display 2D subtitles.

The video distribution device 200 distributes a subtitle set according to the processing capability of the video processing device that has been received along with the request for distribution. Since a transport stream includes a subtitle set that is suited to the processing capability of the video processing device that has transmitted the notification, the decoder assignment unit 351 of the video processing device 300 performs processing assuming that a subtitle set distributed in the 2ES mode is included in the transport stream, for example.

Figure 14:
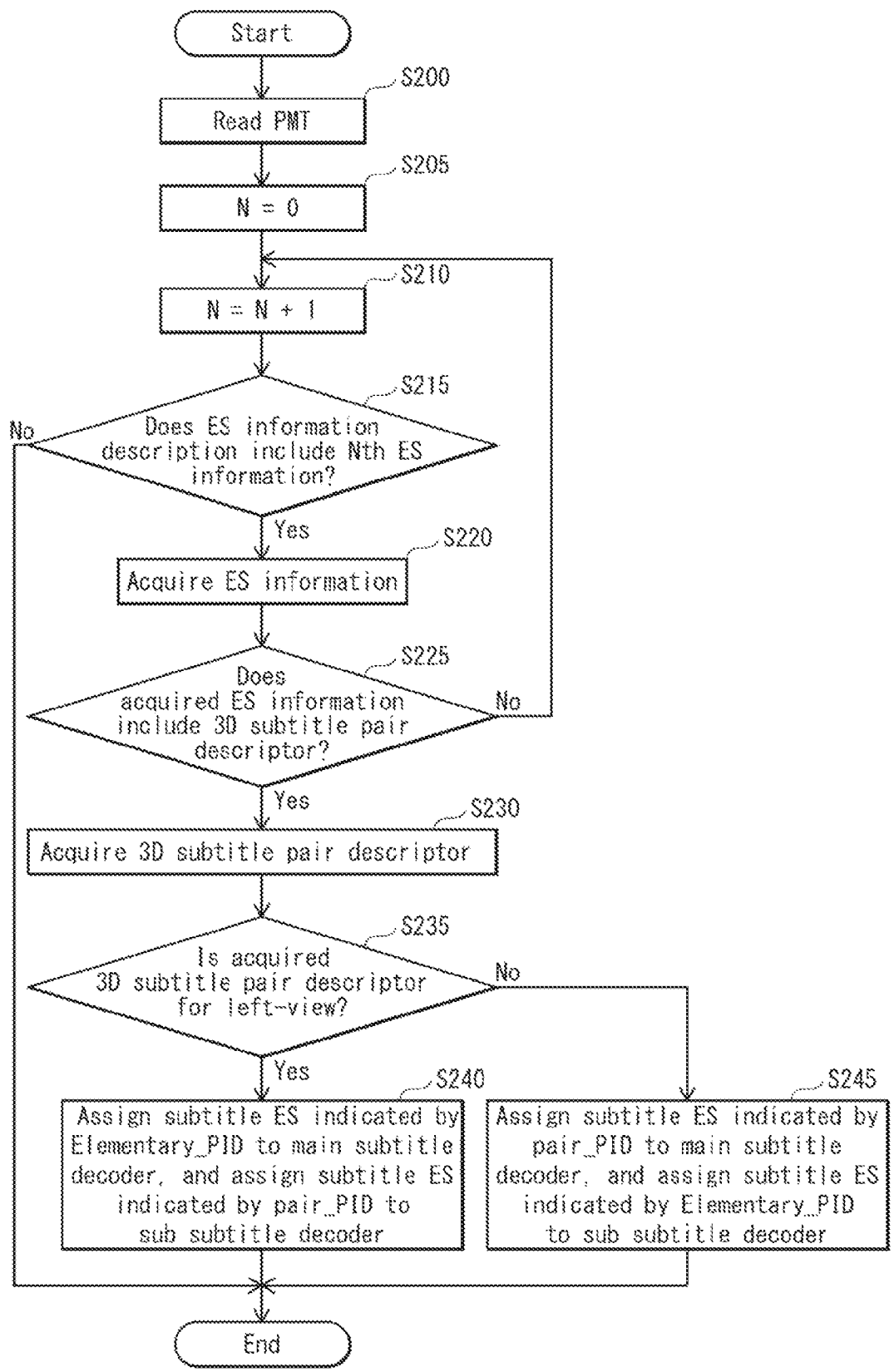
FIG. 14 is a flowchart showing the operation of a decoder assignment unit 351 when subtitles are distributed in accordance with a processing capability of the video processing device.

The following describes the operations of the decoder assignment unit 351 of the video processing device 300 in the present modification, with reference to the flowchart shown in FIG. 14.

The decoder assignment unit 351 reads the PMT included in the SI/PSI information relative to a program selected by a user (step S200).

The decoder assignment unit 351 assigns 0 to a variable "N" (step S205).

Subsequently, the decoder assignment unit 351 increments the variable "N" by one (step S210).

The decoder assignment unit 351 determines whether the ES information description D101 includes the $N^{th}$ ES information (step S215).

When it is determined that the ES information description D101 includes $N^{th}$ ES information ("Yes" in step S215), the decoder assignment unit 351 acquires $N^{th}$ ES information (step S220).

The decoder assignment unit 351 determines whether the ES information includes the 3D subtitle pair descriptor (stereoscopic_subtitle_pair_descriptor) (step S225).

When it is determined that the ES information includes the 3D subtitle pair descriptor ("Yes" in step S225), the decoder assignment unit 351 acquires the 3D subtitle pair descriptor included in the ES information (step S230).

The decoder assignment unit 351 determines whether the acquired 3D subtitle pair descriptor is for left-view (step S235). To be specific, the decoder assignment unit 351 determines whether a value of "subtitle_view" included in the acquired 3D subtitle pair descriptor is "0x0".

When it is determined that the acquired 3D subtitle pair descriptor is for left-view ("Yes" in step S235), the decoder assignment unit 351 designates the main subtitle decoder 360 as the output destination of packets of a subtitle ES having a PID indicated by the "elementary_PID" included in the ES information and designates the sub subtitle decoder 361 as the output destination of packets of a subtitle ES having a PID indicated by "pair_PID" included in the 3D subtitle pair descriptor (step S240). As a result of this, only packets each having a PID that is the same as Elementary_PID are output to the main subtitle decoder 360, and only packets each having a PID that is the same as pair_PID are output to the sub subtitle decoder 361.

When it is determined that the acquired 3D subtitle pair descriptor is not for left-view, i.e., when it is determined that the acquired 3D subtitle pair descriptor is for right-view ("No" in step S235), the decoder assignment unit 351 designates the sub subtitle decoder 361 as the output destination of packets of a subtitle ES having the PID indicated by "pair_PID" included in the 3D subtitle pair descriptor, and designates the main subtitle decoder 360 as the output destination of packets of a subtitle ES having a PID indicated by the "elementary_PID" included in the ES information (step S245).

When it is determined that the ES information does not include the 3D subtitle pair descriptor ("No" in step S225), the processing returns to step S210.

When the ES information description D101 does not include the $N^{th}$ ES information ("No" in step S215), the processing ends.

In the present modification, in order to quickly assign the pair of subtitles to the decoders, once reading one of the ES information of the left-view subtitle ES and the ES information of the right-view subtitle ES, reading the remaining ES information is not performed. Therefore, in order to identify PIDs of video images and audio, another processing is needed. In order to identify PIDs of video images and audio in parallel with assignment of the pair of subtitles to the decoders, even after reading the ES information of the left-view subtitle ES or the ES information of the right-view subtitle ES, if the PIDs of the video images and audio have not been identified, subsequent ES information may be read until PIDs of video images and audio are identified.

In the present modification, there is no description on processing of the video processing device 300 performed when the ES information of the left-view subtitle ES and the ES information of the right-view subtitle ES are not included. However, when these pieces of ES information are not included and a subtitle set distributed in the 1ES mode is included, left-view subtitles and right-view subtitles are reproduced by using the subtitle set.

Even when the subtitle set distributed in the 1ES mode is included, in order to quickly assign the pair of subtitles to the decoders, reading ES information may not be performed after reading any one of the ES information of the left-view subtitle ES and the ES information of the right-view subtitle ES. In this case, if the ES information of a subtitle ES distributed in the 1ES mode is read before reading any one of the ES information of the left-view subtitle ES and the ES information of the right-view subtitle ES, a value of the Elementary_PID may be stored, and if the ES information of the left-view subtitle ES and the ES information of the right-view subtitle ES are read, a value of the Elementary_PID of subtitles distributed in the 1ES mode may be discarded, and any one of the ES information of the left-view subtitle ES and the ES information of the right-view subtitle ES may be assigned to the main subtitle decoder and the sub subtitle decoder, and if neither ES information of the left-view subtitle ES nor the ES information of the right-view subtitle ES are included even after reading all pieces of the ES information in the PMT, a subtitle ES having a PID indicated by the Elementary_PID of subtitles distributed in the 1ES mode may be assigned to the main subtitle decoder.

2.9. Other Modifications

The present invention is not limited to this. For instance, the following modifications may be applied.

(1) In the above embodiment, when subtitles are distributed in the 2ES mode, the 3D subtitle pair descriptor includes "pair_PID" to identify a subtitle ES that is to be paired with a PID corresponding to "pair_PID" (hereinafter, such a subtitle ES is referred to as "paired subtitle ES"). However, the present invention is not limited to this.

Any method suffices if a paired subtitle ES can be identified. For example, a parameter other than a PID such as component_tag may be used to identify a paired subtitle ES.

Alternatively, a distribution device and a reception device may be set to follow a rule determining that a value of a PID or component_tag of the right-view subtitles uses a value resulting from adding a fixed value to a value of a PID or to component_tag of the left-view subtitles, or a value resulting from subtracting a fixed value from the value of the PID or from component_tag of the left-view subtitles. As a result, when a PID or component_tag of an ES is received, a PID or component_tag of a paired ES is identified.

Alternatively, a distribution device and a reception device may be set to follow a rule defining a range of the parameter such as the PID or component_tag assigned only to the left-view subtitles or the right-view subtitles that are to be distributed in the 2ES mode. As a result, left-view subtitles or right-view subtitles that are to be distributed in the 2ES mode are identified when the reception device receives a parameter such as a PID or component_tag is received. In this case, the distribution device and the reception device may be set to follow a rule that assigns "0×31" to the component_tag of the left-view subtitles that are to be distributed in the 2ES mode, and assigns "0×32" to the component_tag of the right-view subtitles that are to be distributed in the 2ES mode.

A paired subtitle ES may not be identified by using a PID or component_tag. Subtitle ESs that are to be assigned to the main subtitle decoder and the sub subtitle decoder may be identified by specifying subtitles of video images on which the subtitle ESs are superimposed. In this case, ES information of the left-view subtitle ES includes a PID or component_tag in order to identify left-view video images.

(2) In the above embodiment, the 3D subtitle pair descriptor (stereoscopic_subtitle_pair_descriptor) is described in the PMT. However, the present invention is not limited to this.

The 3D subtitle pair descriptor may be described in another table in the SI/PSI information. For example, the 3D subtitle pair descriptor may be described in an EIT loop in the SI. Alternatively, the 3D subtitle pair descriptor may be described in both the SI and the PSI.

Since the SI such as the EIT can be acquired before a program starts, the decoder assignment unit 351 can identify the PID of the left-view subtitle ES and the PID of the right-view subtitle ES before the program starts. Since the SI is distributed before the program starts and the PID might be changed before the program, the 3D subtitle pair descriptor described in the SI and the 3D subtitle pair descriptor described in the PSI may be compared when the program starts, and if the descriptors do not match, the information described in the PSI may be prioritized.

(3) In the above embodiment, whether a subtitle set is distributed in the 2ES mode is determined by using the 3D subtitle pair descriptor. However, the present invention is not limited to this.

For example, locations that are not being used, such as locations of "reserved" and a location of "reserved_future_use" in the SI/PSI table, may be extended, and information that is the same as information described in the 3D subtitle pair descriptor may be divided and described in the extended locations.

(4) In the above embodiment, the 3D subtitle pair descriptor is provided for each of the ES information of the left-view subtitles and the ES information of the right-view subtitles, and each 3D subtitle pair descriptor includes descriptions of "view" and "pair_PID". However, the present invention is not limited to this.

The 3D subtitle pair descriptor may be described in the ES information of one of the subtitle ESs, and only "view" may be described in the ES information of both of the subtitle ESs.

For example, when the 3D subtitle pair descriptor is described in one of the ES information of the left-view subtitles and the ES information of the right-view subtitles, the 3D subtitle pair descriptor is described in preceding one of the ES information of the right-view subtitles and the ES information of the left-view subtitles described in the ES information description D101. Accordingly, it is possible to identify the left-view subtitle ES and the right-view subtitle ES at the point of reading one of the ES information of the left-view subtitles and the ES information of the right-view subtitles, i.e., the ES information that precedes in the ES information description D101. This shortens the amount of time before subtitles are actually displayed.

(5) In the above embodiment, the ES information including the 3D subtitle pair descriptor is acquired in step S115 shown in FIG. 12. However, when a plurality of pieces of ES information each including the 3D subtitle pair descriptor are described, the plurality of pieces of ES information may be acquired.

In this case, the number of iterations of the processing of steps S120, S125 and S130 may equal the number of pieces of ES information.

When the 3D subtitle pair does not exist and a plurality of pieces of ES information of subtitle ESs are included, the plurality of pieces of ES information may be acquired.

In this case, the number of iterations of the processing of steps S140 may equal the number of pieces of ES information, and a plurality of PIDs may be assigned to the main subtitle decoder 360.

(6) In the above embodiment, the video processing device 301 prioritizes display of a subtitle set distributed in the 2ES mode by displaying the subtitle set distributed in the 2ES mode when a transport stream contains the subtitle set distributed in the 2ES mode, and displaying a subtitle set distributed in the 1ES mode when the transport stream does not contain a subtitle set distributed in the 2ES mode. However, the present invention is not limited to this.

Alternatively, display of a subtitle set distributed in the 1ES mode may be prioritized. To be specific, the decoder assignment unit 351 may cause the screen to display the subtitle set distributed in the 1ES mode when a transport stream contains the subtitle set distributed in the 1ES mode, and cause the screen to display a subtitle set distributed in the 2ES mode when a transport stream does not contain the subtitle set distributed in the 1ES mode.

Alternatively, a user may select, beforehand or when the user views a program, one of the subtitle set distributed in the 1ES mode and the subtitle set distributed in the 2ES mode that is to be prioritized, and the decoder assignment unit 351 may cause the screen to preferentially display the subtitle set selected by the user.

Alternatively, the video distribution device 200 may store, in the SI/PSI, and distribute information on which of subtitle sets the video distribution device 200 wants to preferentially display, and the video processing device 301 may refer to the information and determine a subtitle set to be preferentially displayed.

(7) The above embodiments and modifications may be combined with one another.

2.10 Conclusion

As described above, a deliverer might provide one program with two or more of a 2D subtitle set, a 3D subtitle set distributed in the 1ES mode, a 3D subtitle set distributed in the 2ES mode, etc., in order to support various devices such as a 2D video display device that does not support 3D, a 3D video display device that supports only a method of distributing subtitles in the 1ES mode, a 3D video display device that supports methods of distributing subtitles in the 1ES and 2ES modes, etc. Although the subtitle sets appear differently to a viewer, i.e., perceived as being planar or stereoscopic, the subtitle sets are subtitle data of the same content. Therefore, the video processing device has only to display only one of the plurality of subtitle sets.

Therefore, in the present embodiment, the video distribution device distributes video images and a plurality of subtitle sets, and the video processing device selects and displays the most suitable subtitle, and in the above modification, the video distribution device distributes only video images and a subtitle set that are suited to the processing capability of the video processing device.

When a program is distributed by CDN and through open interne network, for example, if a 3D video distribution device acquires a processing capability of a 3D video display device before the program is distributed and the 3D video display device returns subtitle sets that are to be displayed (2D subtitles, subtitles to be distributed in the 1ES mode, and subtitles to be distributed in the 2ES mode) to the 3D video distribution device, the 3D video distribution device distributes the most suitable subtitle set included in the program and does not distribute other subtitle sets. This reduces the amount of data to be distributed and network bandwidth to be used. Note that the 3D video distribution device may not acquire a processing capability to determine the most suitable subtitle set, and the 3D video display device itself may acquire the most suitable subtitle set according to its processing capability or user's taste and selection.

3. Embodiment 2

In Embodiment 1 described above, when the 3D subtitle pair descriptor (stereoscopic_subtitle_pair_descriptor) shown in FIG. 5 is used, it is possible to determine whether the subtitle ES is an ES of a subtitle set distributed in the 2ES mode, according to whether the subtitle ES includes this descriptor.

However, the subtitle sets to be distributed in the 1ES mode include 2D subtitles and 3D subtitles to be distributed in the 1ES mode. Further, in some cases, the 3D subtitle set distributed in the 1ES mode is stereoscopically displayed in the 1-plane+offset mode, and in some cases, left-view subtitle images and right-view subtitle images of the 3D subtitle set are distributed as one ES and are stereoscopically displayed in the 2-plane+offset playback mode.

Therefore, in order that a video processing device that does not support subtitles to be distributed in the 2ES mode but supports 3D subtitles to be distributed in the 1ES mode and displayed in the 1-plane+offset mode displays a suitable subtitle ES, it is necessary to determine whether the subtitle ES distributed in the 1ES mode are 2D subtitles or 3D subtitles, whether the playback mode is in the 1-plane+offset mode or the 2-plane+offset mode, and whether an ES of a subtitle set is distributed in the 1ES mode or the 2ES mode.

In the present embodiment, description is made on a video processing system 100a capable of determining the above.

Figure 15:
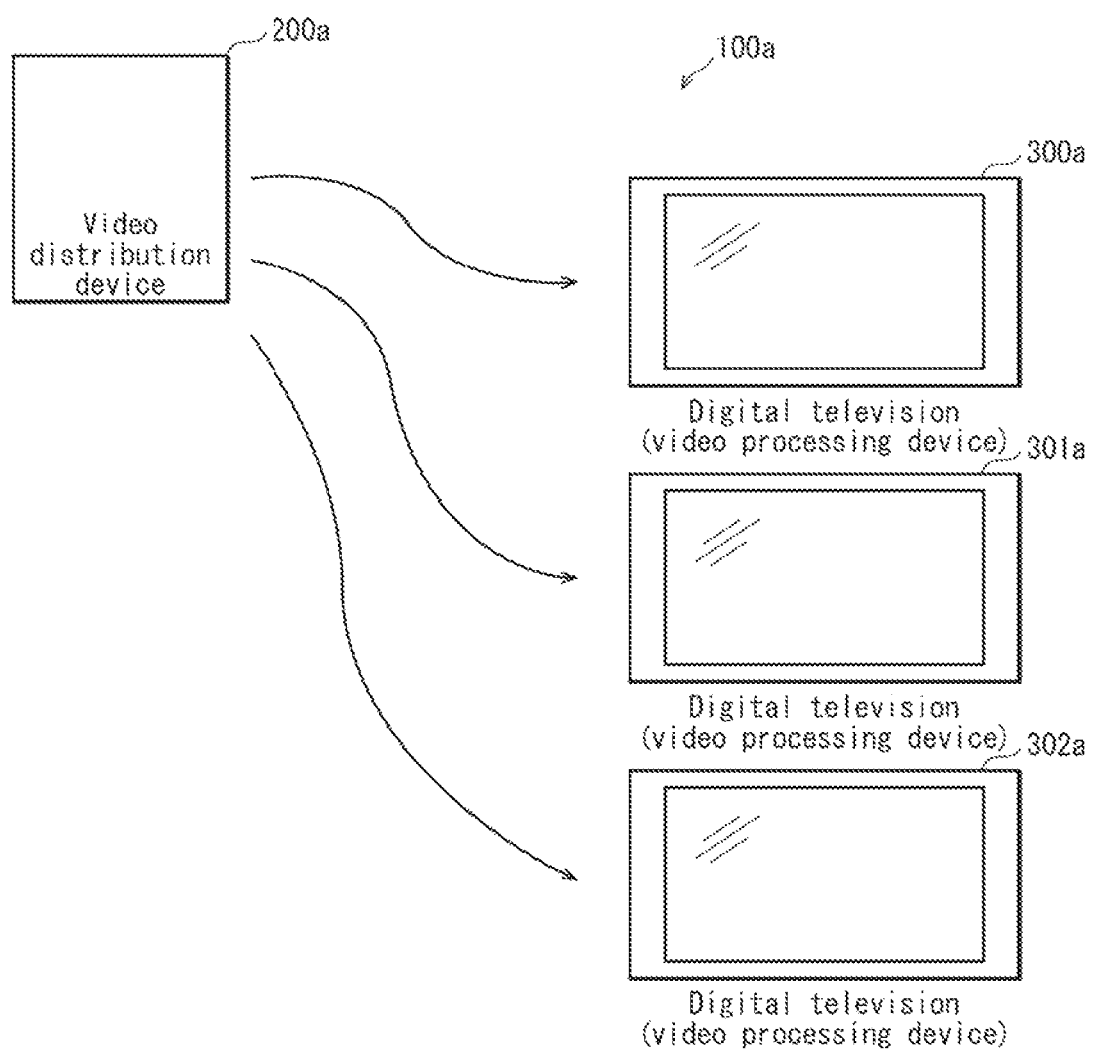

The video processing system 100a includes a video distribution device 200a and video processing devices 300a, 301a and 302a, as shown in FIG. 15. The video processing device 300a supports distribution of subtitles in the 1ES and 2ES modes. The video processing device 301a supports only distribution of subtitles in the 1ES modes. The video processing device 302a does not support 3D (i.e., displays 2D video images).

The outline of each device is the same as that in Embodiment 1, and a description thereof is omitted.

Components of each device are now described, focusing on the differences from Embodiment 1.

3.1 Video Distribution Device 200a

Figure 16:
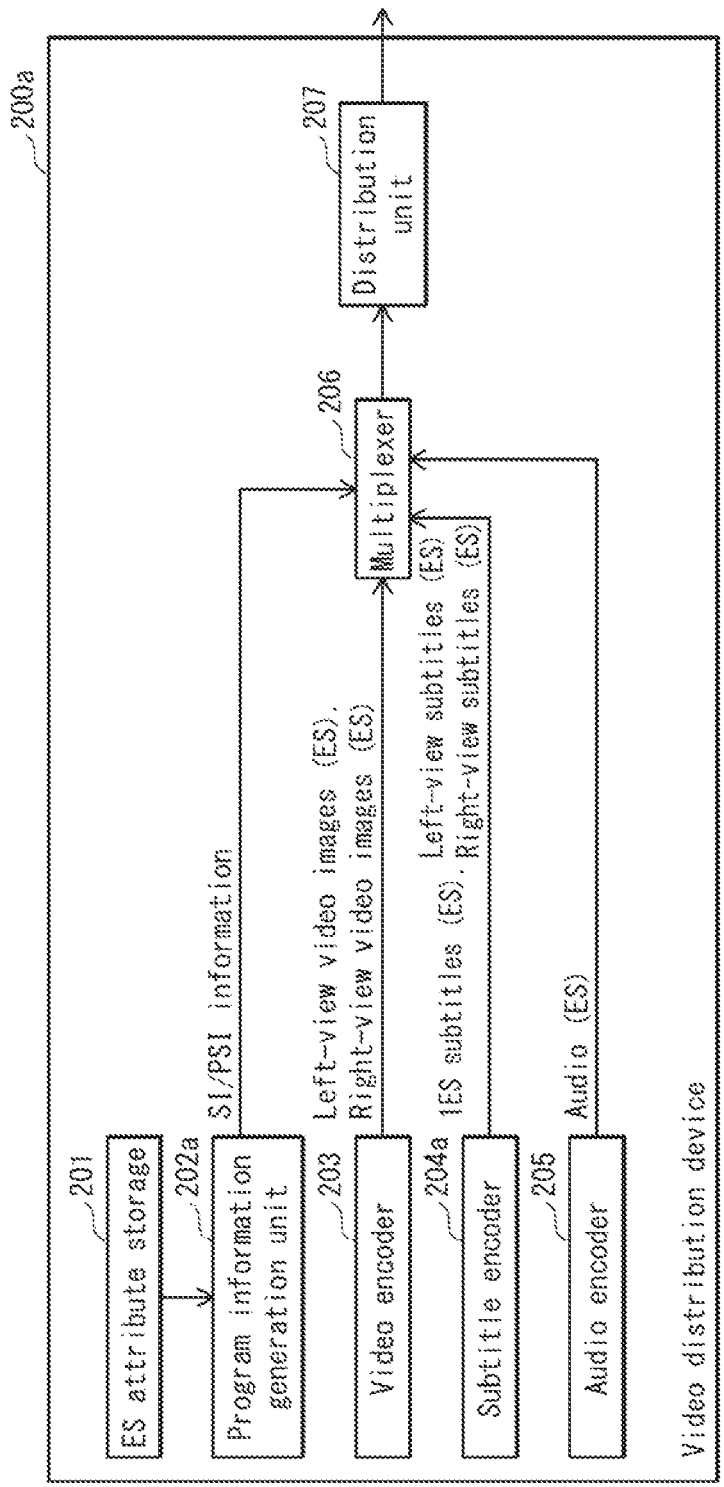

The video distribution device 200a includes an ES attribute storage 201, a program information generation unit 202, a video encoder 203, a subtitle encoder 204a, an audio encoder 205, a multiplexer 206 and a distribution unit 207, as shown in FIG. 16.

The ES attribute storage 201, the video encoder 203, the audio encoder 205, the multiplexer 206 and the distribution unit 207 have been already described in Embodiment 1 and the description thereof is omitted here.

(1) Program Information Generation Unit 202a

The program information generation unit 202a generates SI/PSI information based on information stored in the ES attribute storage 201, and outputs the generated SI/PSI information to the multiplexer 206.

Here, Embodiment 2 is different from Embodiment 1 in that information described in the PMT is not the 3D subtitle pair descriptor but a 3D subtitle descriptor (stereoscopic_subtitle_descriptor) D500.

The following describes the 3D subtitle descriptor D500.

FIG. 17 shows an example of the 3D subtitle descriptor (stereoscopic_subtitle_descriptor) D500 described in the second loop of the PMT obtained by extending ISO/IEC13818-1 (MPEG-2) and the ARIB.

The 3D subtitle descriptor D500 is described in the ES information description D101 as ES information of a subtitle ES of a 3D subtitle set.

The 3D subtitle descriptor D500 consists of parameters such as descriptor_tag, descriptor_length, subtitle_mode, subtitle_component, subtitle_view, pair_PID and reserved.

The parameter "descriptor_tag" is information informing a video processing device capable of performing 3D display that this descriptor D500 is a 3D subtitle descriptor. The parameter "descriptor_tag" has a fixed value. For example, since a value of tag of a descriptor defined by the deliverer falls within the range from "0×80" to "0×BF", "0×81" is set here.

The parameter "descriptor_length" indicates a byte length of data part of a descriptor that is immediately after this field. This parameter has a fixed length. Since a byte length of the following parameters is 2, the fixed length "2" is assigned thereto.

The parameter "subtitle_mode" indicates whether an ES corresponding thereto is a subtitle ES to be played back in the 1-plane+offset mode or a subtitle ES to be played back in the 2-plane+offset mode. If the ES is played back in the 1-plane+offset mode, "subtitle_mode" is assigned "0", and if the ES is played back in the 2-plane+offset mode, "subtitle_mode" is assigned "1".

The parameter "subtitle_component" indicates whether the ES includes subtitles to be distributed in the 1ES mode or part of subtitles to be distributed in the 2ES mode. If the ES includes the subtitles to be distributed in the 1ES mode, "subtitle_component" is assigned "0", and if the ES includes the subtitles to be distributed in the 2ES mode, "subtitle_component" is assigned "1".

The parameter "subtitle_view" indicates whether the ES is a left-view subtitle ES or a right-view subtitle ES. In the case of the left-view subtitle ES, "subtitle_view" is assigned "0", and in the case of the right-view subtitle ES, "subtitle_view" is assigned "1".

The parameter "pair_PID" indicates a PID of a subtitle ES that is to be paired with the ES when the video distribution device 200a distributes 3D subtitles in the 2ES mode. If the ES is a left-view subtitle ES, "pair_PID" is assigned a PID of a right-view subtitle ES, and if the ES is the right-view subtitle ES, "pair_PID" is assigned a PID of the left-view subtitle ES.

The parameter "reserved" is always assigned "1".

For example, to play back a 3D subtitle ES distributed in the 1ES mode (hereinafter, this ES is referred to as "1ES-3D subtitle ES") in the 1-plane+offset mode, the parameter "subtitle_mode" is assigned "0" and the parameter "subtitle_component" is assigned "0". For example, to play back the 1ES-3D subtitle ES in the 2-plane+offset mode, the parameter "subtitle_mode" is assigned "1" and the parameter "subtitle_component" is assigned "1". To play back a left-view subtitle ES distributed in the 2ES mode, the parameter "subtitle_mode" is assigned "1", the parameter "subtitle_component" is assigned "1", the parameter "subtitle_view" is assigned "0" and the parameter "pair_PID" is assigned Elementary_PID of a right-view subtitle ES.

FIG. 18 is a schematic view showing part of the PMT to be distributed to each video processing device. In FIG. 18, specific information on a 1ES-3D subtitle ES and a left-view subtitle ES that are to be played back in the 1-plane+offset mode is described in the ES information description D101 shown in FIG. 6, which shows the data structure of the PMT.

For example, ES information D601 is ES information of a 1ES-3D subtitle ES to be played back in the 1-plane+offset mode. By describing, in the 3D subtitle descriptor shown in FIG. 17, specific information of the 1ES-3D subtitle ES that is to be played back in the 1-plane+offset mode, a descriptor D602 included in the ES information D601 is attained. Although there must normally be a location for "reserved" and a description of "ES_info_length" before or after "elementary_PID" as shown in FIG. 6, these descriptions are omitted in ES information D601 and D603 shown in FIG. 18.

The stream_type in the ES information D601 is assigned "0×06" that is a value of "stream_type" in the ES attribute list T100 shown in FIG. 5, and the Elementary_PID in the ES information D601 is assigned "0×0112" that is a value of "PID" of the ES attribute list T100.

The descriptor_tag in the ES information D601 is assigned "0×81" that is an ID of a descriptor, which shows the descriptor D602 is a 3D subtitle descriptor. The descriptor_length is assigned "0×2", which is a byte length of the following descriptor. The subtitle_mode is assigned "0×0", which indicates that an ES corresponding thereto is to be played back in the 1-plane+offset mode. The subtitle_component is assigned "0×0", which indicates that the ES includes subtitles to be distributed in the 1ES mode. The "reserved" has 14 bits each having the fixed value "1", and accordingly "0×3FFF" that represents a binary number "0×11111111111111" in hexadecimal.

The ES information D603 indicates information on a left-view subtitle ES. By describing the specific information on the left-view subtitle ES in the 3D subtitle descriptor D500 shown in FIG. 17, a descriptor D604 included in the ES information D603 is attained.

The "stream_type" in the ES information D603 is assigned "0×06" that is a value of stream_type of the ES attribute list T100, and the "Elementary_PID" in the ES information D603 is assigned "0×0113" that is a value of PID of the ES attribute list T100.

The "descriptor_tag" in the ES information D603 is assigned "0×81" that is an ID of a descriptor, which shows the descriptor D602 is a 3D subtitle descriptor. The "descriptor_length" is assigned "0×2", which is a byte length of the following descriptor. The "subtitle_mode" is assigned "0×1", which indicates that the ES is to be played back in the 2-plane+offset mode. The "subtitle_component" is assigned "0×1", which indicates that the ES subtitles are part of the subtitles to be distributed in the 2ES mode. The "subtitle_view" is assigned "0×0", which indicates that this ES is a left-view subtitle ES. The "pair_PID" is assigned "0×0114", which is a value of "Elementary_PID" of a right-view subtitle ES. The value of the "Elementary_PID" of the right-view subtitle ES is obtainable from the ES attribute T100.

In the present embodiment, the 3D subtitle descriptor is described in the ES information of the subtitle ES. However, the present invention is not limited to this. The 3D subtitle descriptor may be described in ES information of an ES including text strings of superimposed characters and bitmaps. In the ARIB standard, subtitles and superimposed characters can be displayed on the subtitle plane. Superimposed characters can therefore also be displayed stereoscopically by the same processing as subtitles.

(2) Subtitle Encoder 204a

The subtitle encoder 204a encodes subtitles using a standard such as MPEG-1 and MPEG-2 based on the descriptions of the 3D subtitle descriptor D500, generates a subtitle ES for 2D display, a 1ES-3D subtitle ES that is to be played back in the 1-plane+offset mode, a 1ES-3D subtitle ES that is to be played back in the 2-plane+offset mode, and a subtitle ES to be distributed in the 2ES mode (i.e., a left-view subtitle ES and a right-view subtitle ES), etc., and outputs the generated subtitle ESs to the multiplexer 206.

3.2 Video Processing Device 300a

Figure 19:
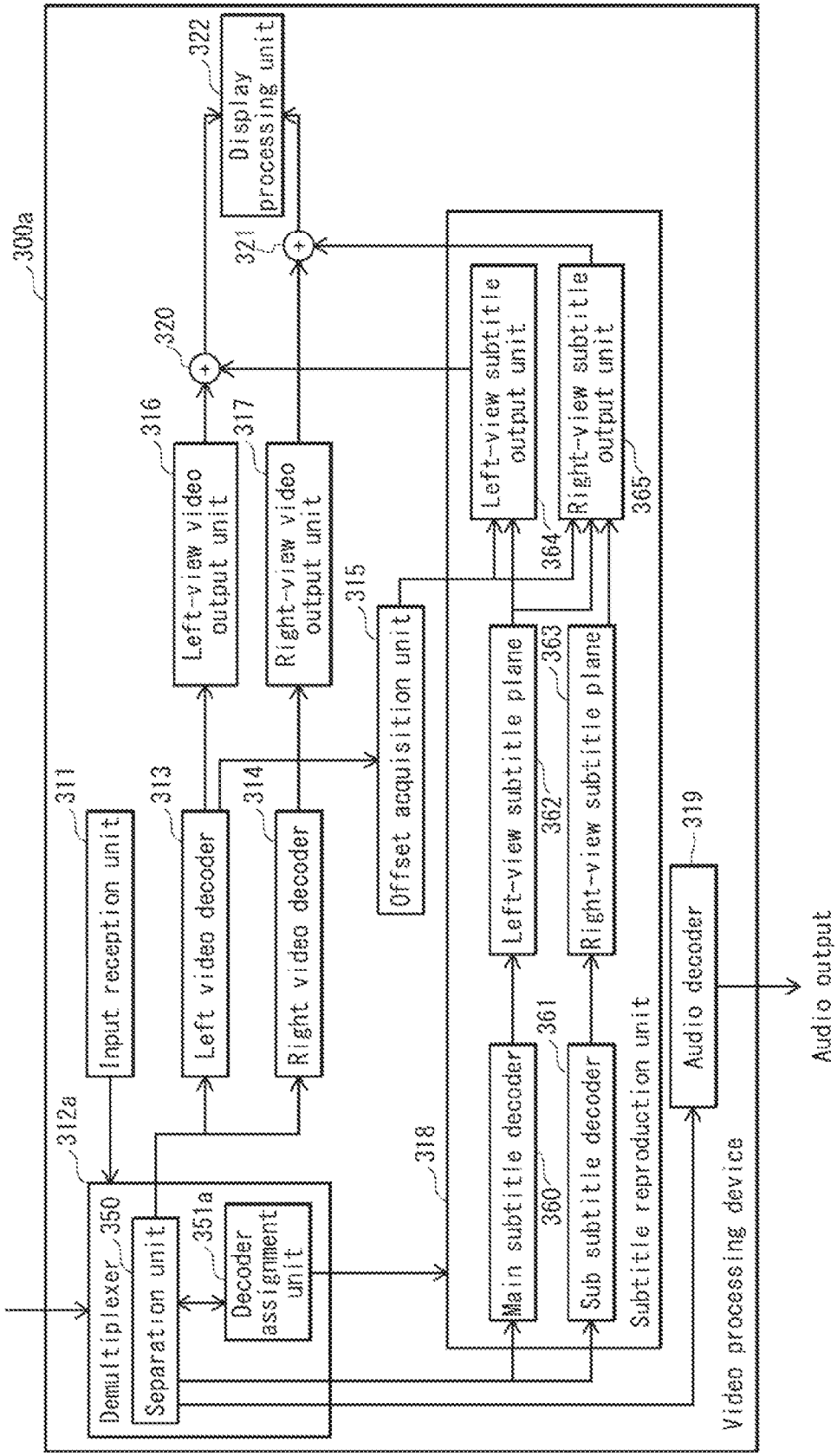

The video processing device 300a is a digital television that receives a digital broadcast from the video distribution device 200a, and achieves stereoscopic viewing by displaying both video images and subtitles. As shown in FIG. 19, the video processing device 300a includes an input reception unit 311, a demultiplexer 312a, a left video decoder 313, a right video decoder 314, an offset acquisition unit 315, a left-view video output unit 316, a right-view video output unit 317, a subtitle reproduction unit 318, an audio decoder 319, a superimposition units 320 and 321, and a display processing unit 322.

The demultiplexer 312a includes a separation unit 350 and a decoder assignment unit 351a.

The following describes the demultiplexer 312a and in particular the decoder assignment unit 351a, which are different from the components of the video processing device 300 in Embodiment 1.

(1) Decoder Assignment Unit 351a

The decoder assignment unit 351a analyzes the SI/PSI information such as PAT and PMT, and identifies to which decoder each packet is output.

Since video packets and audio packets are a matter of conventional technology, a description thereof is omitted.

Here, description is made on identification of a decoder to which a subtitle packet is output.

The decoder assignment unit 351a refers to various pieces of table information of the SI/PSI information relative to a program selected by a user, e.g., PMT, and determines whether the PMT includes a 3D subtitle descriptor.

When determining that the PMT includes a 3D subtitle descriptor, the decoder assignment unit 351a identifies a playback mode and a distribution mode of subtitles that are to be used for 3D display, based on the description of the 3D subtitle descriptor. To be specific, the decoder assignment unit 351a determines whether subtitles are to be played back in the 2-plane+offset mode or the 1-plane+offset mode, and determines whether an ES has been distributed in the 1ES mode or in the 2ES mode.

According to the results of the determinations, the decoder assignment unit 351a appropriately assigns packets of the subtitle ES to the main subtitle decoder and the sub subtitle decoder. To be specific, when the subtitles are to be played back in the 2-plane+offset mode and have been distributed in the 2ES mode, the decoder assignment unit 351a respectively assigns packets of the left-view subtitle ES and packets of the right-view subtitle ES to the main subtitle decoder 360 and the sub subtitle decoder 361. When the subtitles are to be played back in the 2-plane+offset mode and have been distributed in the 1ES mode, the decoder assignment unit 351a assigns packets of the subtitle ES to both the main subtitle decoder 360 and the sub subtitle decoder 361. When the subtitles are to be played back in the 1-plane+offset mode and have been distributed in the 1ES mode, the decoder assignment unit 351a assigns packets of the subtitle ES to merely the main subtitle decoder 360.

As the analysis result of the SI/PSI information, the decoder assignment unit 351a notifies the subtitle reproduction unit 318 whether the PMT includes a 3D subtitle descriptor, and notifies the subtitle reproduction unit 318 of a playback mode and a distribution mode of subtitles used in 3D display when the PMT includes a 3D subtitle descriptor.

In this case, the separation unit 350 outputs each packet to a suitable decoder according to the result of the assignment by the decoder assignment unit 351a. When receiving a notification that the PMT does not include a 3D subtitle descriptor from the decoder assignment unit 351a, the subtitle reproduction unit 318 processes subtitle packets received from the separation unit 350 for 2D display. When receiving a notification that the PMT includes a 3D subtitle descriptor from the decoder assignment unit 351a, the subtitle reproduction unit 318 reproduces left-view subtitles and right-view subtitles based on the playback mode and the distribution mode determined by the decoder assignment unit 351a.

3.3 Operations (1) Operations of Video Distribution Device 200a

The following describes the operations of the video distribution device 200a with reference to the flowchart shown in FIG. 11, centering on points of difference from the operations of the video distribution device 200.

Descriptions of the SI/PSI information generated in step S5 and in particular descriptions of the PMT are different from those in Embodiment 1. To be specific, when subtitles are stereoscopically displayed, the program information generation unit 202a in the video distribution device 200a describes a 3D subtitle descriptor in the ES information description D101 in the PMT.

Further, Embodiment 2 differs from Embodiment 1 in that at least one subtitle ES is generated according to the descriptions of the PMT generated in step S5, and to be specific, according to the descriptions of the 3D subtitle descriptor. Regardless of whether the PMT includes a 3D subtitle descriptor, a subtitle ES for 2D display is always generated.

(2) Operations of Video Processing Device 300a

Figure 20:
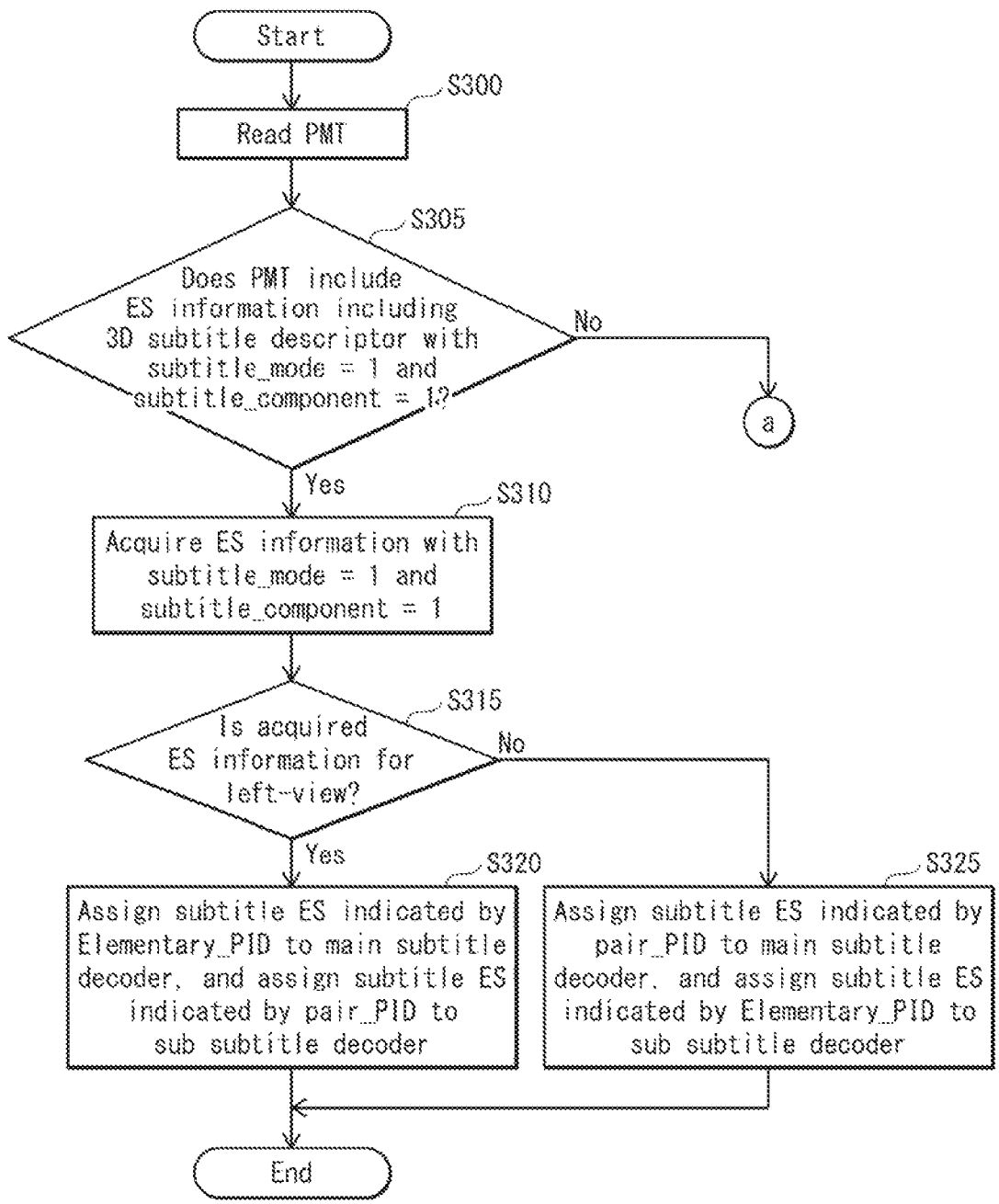
FIG. 20 is a flowchart showing the operation of a decoder assignment unit 351a, continuing to FIG. 21.
Figure 21:
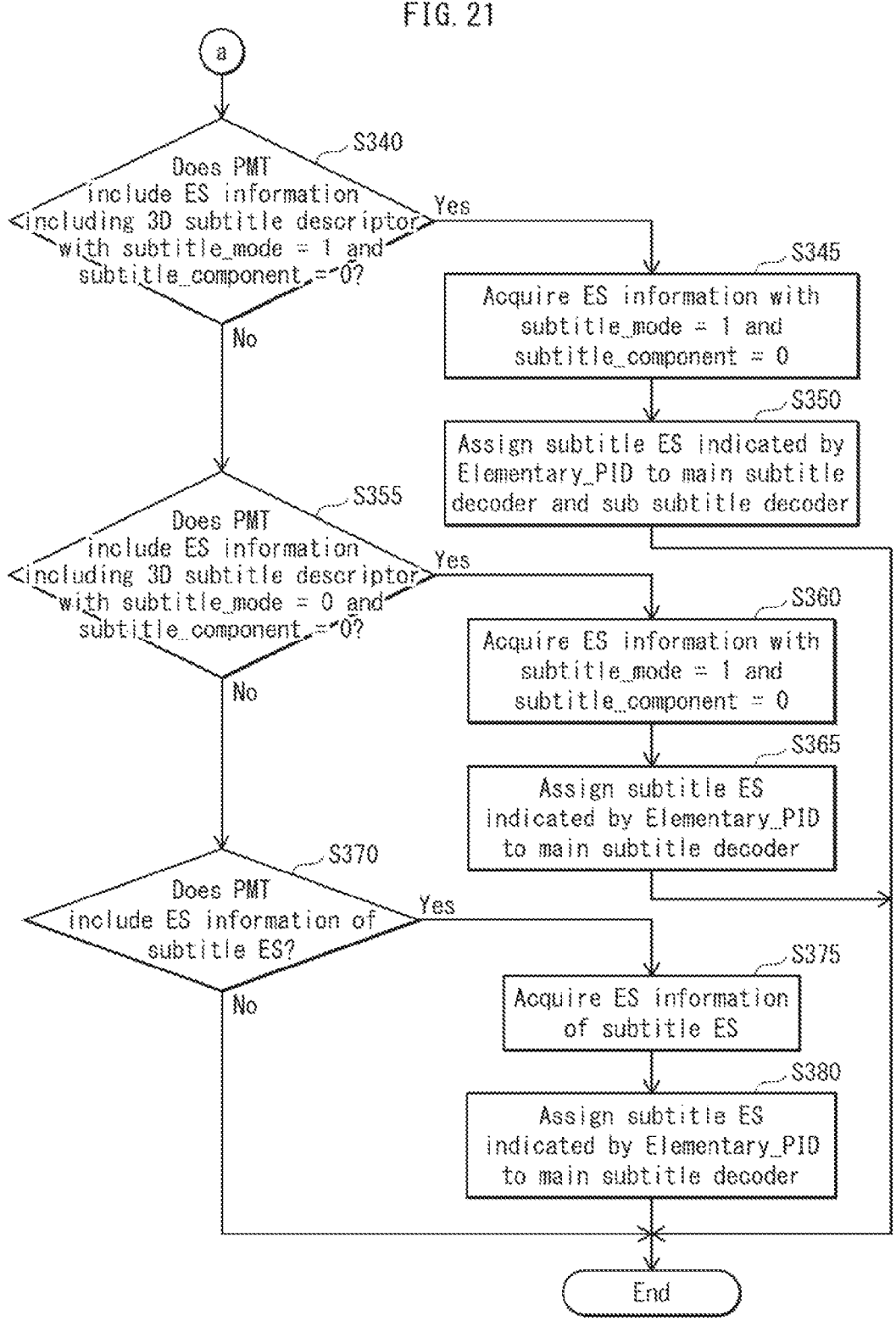
FIG. 21 is a flowchart showing the operation of the decoder assignment unit 351a, continuing from FIG. 20.

The following describes the operations of the video processing device 300a, and in particular the operations of the decoder assignment unit 351a assigning subtitle ESs to the decoders, with reference to the flowcharts shown in FIGS. 20 and 21.

The decoder assignment unit 351a reads the PMT included in the SI/PSI information relative to a program selected by a user (step S300).

The decoder assignment unit 351a determines whether the read PMT includes a 3D subtitle descriptor (stereoscopic_subtitle_descriptor) and ES information with subtitle_mode=1 and subtitle_component=1 (step S305).

When the PMT includes the ES information with subtitle_mode=1 and subtitle_component=1 ("Yes" in step S305), the decoder assignment unit 351a acquires the ES information (step S310).

The decoder assignment unit 351a determines whether the acquired ES information is for left-view (step S315). To be specific, the decoder assignment unit 351a determines whether a value of subtitle_view included in the acquired ES information is 0.

When the acquired ES information is for left-view ("Yes" in step S315), the decoder assignment unit 351a designates the main decoder 360 as the output destination of packets of a subtitle ES having a PID indicated by "elementary_PID" included in the ES information, and designates the sub subtitle decoder 361 as the output destination of packets of a subtitle ES having a PID indicated by "pair_PID" included in the 3D subtitle descriptor (step S320). As a result of this, only packets each having the same PID as Elementary_PID are output to the main subtitle decoder 360, and only packets each having the same PID as pair_PID are output to the sub subtitle decoder 361. At this time, the main subtitle decoder 360 reproduces left-view subtitles from the packets received from the separation unit 350, and the sub subtitle decoder 361 reproduces right-view subtitles from the packets received from the separation unit 350.

When it is determined that the received ES information is not for left-view, i.e., when it is determined that the received ES information is for right-view ("No" in step S315), the decoder assignment unit 351a designates the main subtitle decoder 361 as the output destination of packets of a subtitle ES having a PID indicated by "pair_PID" included in the 3D subtitle descriptor, and designates the sub subtitle decoder 360 as the output destination of packets of a subtitle ES having a PID indicated by the "elementary_PID" included in the ES information (step S325).

When it is determined that the PMT does not include the ES information ("No" in step S305), the decoder assignment unit 351a determines whether the read PMT includes a 3D subtitle descriptor (stereoscopic_subtitle_descriptor) and whether the PMT includes ES information with the subtitle_mode=1 and subtitle_component=0 (step S340).

When the PMT includes the ES information with subtitle_mode=1 and subtitle_component=0 ("Yes" in step S340), the decoder assignment unit 351a acquires the ES information (step S345).

The decoder assignment unit 351a designates both the main subtitle decoder 360 and the sub subtitle decoder 361 as the output destination of packets of a subtitle ES having a PID indicated by "elementary_PID" included in the ES information (step S350). Accordingly, only packets having the same PID as the Elementary_PID are output to the main subtitle decoder 360 and the sub subtitle decoder 361. At this time, the main subtitle decoder 360 reproduces left-view subtitles from packets of the left-view subtitles distributed in the 1ES mode, and the sub subtitle decoder 361 reproduces left-view subtitles from packets of the right-view subtitles distributed in the 1ES mode.

When it is determined that the PMT does not include the ES information ("No" in step S340), the decoder assignment unit 351a determines whether the read PMT includes a 3D subtitle descriptor (stereoscopic_subtitle_descriptor) and ES information with subtitle_mode=0 and subtitle_component=0 (step S355).

When the PMT includes the ES information with subtitle_mode=0 and subtitle_component=0 ("Yes" in step S355), the decoder assignment unit 351a acquires the ES information (step S360).

The decoder assignment unit 351a designates the main subtitle decoder 360 as the output destination of packets of a subtitle ES having a PID indicated by "elementary_PID" included in the ES information (step S350). Accordingly, only packets having the same PID as the Elementary_PID are output to the main subtitle decoder 360. At this time, the sub subtitles decoder 361 does not need to perform decoding. Further, at this time, the subtitle reproduction unit 318 including the main subtitle decoder 360 reproduces left-view subtitles and right-view subtitles that are to be played back in the 1-plane+offset mode.

When it is determined that the PMT does not include the ES information ("No" in step S355), the decoder assignment unit 351a determines whether the PMT includes ES information of a subtitle ES (step S370). This can be determined by using a value of stream_type or component_tag. For example, operation provisions for ARIB specify in "OPERATIONAL GUIDELINES FOR DIGITAL SATELLITE BROADCASTING. ARIB TECHNICAL REPORT" that in a digital broadcast, stream_type of subtitles and superimposed characters is assigned "0x06", component_tag of subtitles is assigned "0x30"-"0x37", and component_tag of superimposed characters is assigned "0x39"-"0x3F".

When it is determined that the PMT includes the ES information ("Yes" in step S370), the decoder assignment unit 351a acquires the ES information of a subtitle ES (step S375).

The decoder assignment unit 351a designates the main subtitle decoder 360 as the output destination of packets of a subtitle ES having a PID indicated by "elementary_PID" included in the ES information (step S380). Accordingly, only packets having the same PID as the Elementary_PID are output to the main subtitle decoder 360. At this time, the sub subtitles decoder 361 does not need to perform decoding. Further, if the distributed video images are stereoscopically displayed, the subtitle reproduction unit 318 including the main subtitle decoder 360 reproduces left-view subtitles and right-view subtitles from a subtitle ES assigned to the main subtitle decoder 360. In this case, each of the subtitles are played back in the 1-plane+offset mode.

When it is determined that the PMT does not include the ES information ("No" in step S370), the processing ends. At this time, since the distributed TS does not include a subtitle ES, no subtitle ES is assigned to the main subtitle decoder 360 and the sub subtitle decoder 361.

3.4 Video Processing Device 301a and Video Processing Device 302a

The following briefly describes subtitle display performed by the video processing device 301a and the video processing device 302a.

The video processing device 301a displays subtitles in the 1-plane+offset mode. Accordingly, the video processing device 301a is not able to stereoscopically display subtitles using a subtitle set distributed in the 2ES mode, and display a subtitle set distributed in the 1ES mode in the 2-plane+offset mode. When the ES information includes a 3D subtitle descriptor, subtitles are displayed in the 1-plane+offset mode by using a subtitle ES indicated by the ES information only when subtitle_mode=0 and subtitle_component=0 are satisfied. When the ES information includes a 3D subtitle descriptor but subtitle_mode=0 and subtitle_component=0 are not satisfied, and when the ES information does not include a 3D subtitle descriptor, the video processing device 301a displays subtitles in the 1-plane+offset mode by using a subtitle ES indicated by the ES information if the PMT includes ES information for 2D.

The video processing device 302a is not able to stereoscopically display subtitles. When the PMT includes ES information not including a 3D subtitle descriptor, i.e., ES information for 2D, the video processing device 302a displays 2D subtitles by using a subtitle ES indicated by the ES information.

3.5 Modifications

The present invention is not limited to the above embodiments. For instance, the following modifications may be applied.

(1) In Embodiment 2, when the subtitles are to be distributed in the 2ES mode, the 3D subtitle descriptor includes "pair_PID" to identify a paired subtitle ES. However, the present invention is not limited to this.

Any method suffices if a paired subtitle ES can be identified. For example, a parameter other than PIDs such as component_tag may be used to identify a paired subtitle ES.

Alternatively, a distribution device and a reception device may be set to follow a rule determining that a value of a PID or component_tag of the right-view subtitles uses a value resulting from adding a fixed value to a value of a PID or to component_tag of the left-view subtitles, or a value resulting from subtracting a fixed value from the value of the PID or from component_tag of the left-view subtitles. As a result, when a PID or component_tag of an ES is received, a PID or component_tag of a paired ES is identified.

Alternatively, a distribution device and a reception device may be set to follow a rule defining a range of a parameter such as the PID or component_tag assigned only to left-view subtitles distributed in the 2ES mode, right-view subtitles distributed in the 2ES mode, subtitles to be played back in the 1-plane+offset mode and distributed in the 1ES mode, and subtitles to be played back in the 2-plane+offset mode and distributed in the 1ES mode. As a result, when a parameter such as a PID or component_tag is received, the distribution device and the reception device can determine whether a subtitle ES is an ES to be played back in the 1-plane+offset mode and distributed in the 1ES mode, an ES to be played back in the 2-plane+offset mode and distributed in the 1ES mode, a left-view subtitle ES, or a right-view subtitle ES. For example, the distribution device and the reception device may be set to follow a rule that assigns "0x31" to the component_tag of the left-view subtitles that are to be distributed in the 2ES mode, and assigns "0x32" to the component_tag of the right-view subtitles that are to be distributed in the 2ES mode.

A paired subtitle ES may not be identified by using a PID or component_tag. Subtitle ESs that are to be assigned to the main subtitle decoder 360 and the sub subtitle decoder 361 may be identified by specifying subtitles of video images on which the subtitle ESs are superimposed. For example, ES information of the left-view subtitle ES includes a PID or component_tag in order to identify left-view video images.

(2) In Embodiment 2, the 3D subtitle descriptor (stereoscopic_subtitle_descriptor) is described in the PMT, but the 3D subtitle descriptor is not limited to be described in the PMT.

The 3D subtitle descriptor may be described in another table in the SI/PSI information. For example, the 3D subtitle descriptor may be described in an EIT loop in the SI. Alternatively, a 3D subtitle descriptor (stereoscopic_subtitle_descriptor) may be described in both the SI and the PSI.

Since the SI such as the EIT can be acquired before a program starts, the decoder assignment unit 351a can identify the PID of the left-view subtitle ES and the PID of the right-view subtitle ES before the program starts. Since the SI is information distributed before the program starts and the PID may be changed immediately before the program, the SI and the stereoscopic_subtitle_descriptor descriptor described in the PSI may be compared when the program starts, and if the SI and the stereoscopic_subtitle_descriptor descriptor do not match, the information described in the PSI may be prioritized.

(3) In Embodiment 2, a distribution mode and a playback mode of a subtitle set to be distributed are identified by using the 3D subtitle descriptor. However, the present invention is not limited to this.

For example, locations that are not being used, such as locations of "reserved" and a location of "reserved_future_use" in the SI/PSI table, may be extended, and information that is the same as information described in the 3D subtitle descriptor may be divided and described in the extended locations.

(4) In Embodiment 2, the 3D subtitle descriptor (stereoscopic_subtitle_descriptor) is described in each of the ES information of the left-view subtitle ES and the ES information of the right-view subtitle ES, and each 3D subtitle descriptor includes view information indicating that a corresponding one of the left-view subtitle ES and the right-view subtitle ES is for left-view or right-view and the parameter "pair_PID" for identifying a paired subtitle ES. However, the present invention is not limited to this.

The 3D subtitle pair descriptor may be described in the ES information of one of the subtitle ESs, and only the view information may be described in both of the subtitle ESs and the parameter "pair_PID" may be omitted.

For example, when the 3D subtitle descriptor is described in one of the ES information of the left-view subtitle ES and the ES information of the right-view subtitle ES, the 3D subtitle descriptor is described in preceding one of the ES information of the left-view subtitle ES and the ES information of the right-view subtitle ES described in the ES information description D101. Accordingly, it is possible to identify the left-view subtitle ES and the right-view subtitle ES at the point of reading one of the information on the left-view subtitle ES and the information on the right-view subtitle ES, i.e., the ES information that precedes in the ES information description D101. This shortens the amount of time before subtitles are actually displayed.

(5) In Embodiment 2, 2D subtitles are separately generated from 3D subtitles. However, the present invention is not limited to this.

The 2D subtitles may be shared with any subtitle ES for 3D subtitles. This can save time and effort in generating and distributing 2D subtitles in addition to the 3D subtitles. In this case, the 3D subtitle descriptor may further include a parameter indicating that a subtitle ES is used as 2D subtitles.

(6) In steps S310 and S345 shown in FIGS. 20 and 21 in Embodiment 2, if there are a plurality of pieces of ES information that satisfy the condition (in the determination step immediately before the steps S310 and S345), the plurality of pieces of ES information may be acquired. In this case, a plurality of PIDs may be assigned to the main subtitle decoder 360 and the sub subtitle decoder 361.

In steps S360 and S375, if there are plural pieces of ES information that satisfy the condition (in the determination step immediately before the steps S360 and S375), the plurality of pieces of ES information may be acquired. In this case, a plurality of PIDs may be assigned to the main subtitle decoder 360.

(7) In Embodiment 2, when there is a subtitle set distributed in the 2ES mode, the subtitle set distributed in the 2ES mode is displayed, when there is not the subtitle set distributed in the 2ES mode, a subtitle set distributed in the 1ES mode is displayed in the 2-plane+offset playback mode, when there is not a subtitle set that has been distributed in the 1ES mode and is to be played back in the 2-plane+offset, the subtitle set distributed in the 1ES mode is played back in the 1-plane+offset is displayed, and when there is no subtitle set, a 2D subtitle set is displayed. That is, the order of precedence for display from highest to lowest is: the subtitle set distributed in the 2ES mode; the subtitle set that has been distributed in the 1ES mode and is to be played back in the 2-plane+offset mode; the subtitle set that has been distributed in the 1ES mode and is to be played back in the 1-plane+offset mode; and the 2D subtitle set. However, the present invention is not limited to this.

The above order of precedence is one example. The order of precedence may vary according to its processing capability and a user's taste and selection, and a certain subtitle set may be prevented to be used.

For example, in the case of the video processing device 302a that supports only the subtitle set that has been distributed in the 1ES mode and is to be played back in the 1-plane+ offset mode, even when the video processing device 302*a* receives the subtitle set distributed in the 2ES mode and the subtitle set that has been distributed in the 1ES mode and is to be played back in the 2-plane+offset mode, assignment to the main subtitle decoder 360 and the sub subtitle decoder 361 may not be performed, and subtitles may be displayed by using only the subtitle set that has been distributed in the 1ES mode and is to be played back in the 1-plane+offset mode.

(8) The above embodiments and modifications may be combined with one another.

3.6 Conclusion

As described above, it is possible to determine whether a subtitle ES is for 2D or 3D according to whether the PMT includes the 3D subtitle descriptor (stereoscopic_subtitle_descriptor). Further, it is possible to determine whether a playback mode is the 1-plane+offset mode or the 2-plane+offset mode according to a value of subtitle_mode. Furthermore, it is possible to determine whether a subtitle set is to be distributed in the 1ES mode or the 2ES mode according to a value of subtitle_component.

As described above, the video distribution device 200*a* newly describes the 3D subtitle descriptor (stereoscopic_subtitle_descriptor) in the PMT as information on a subtitle ES to be displayed in 3D and distributes the PMT to the video processing device 300*a*. The video processing device 300*a* analyzes the PMT by using the decoder assignment unit 351*a*, and outputs subtitle packets to a suitable subtitle decoder according to the analysis result. Thus, subtitles can be superimposed on video images (left-view video images/right-view video images) intended by a deliverer.

4 Modifications

The present invention is not limited to the above embodiments. For instance, the following modifications may be applied.

(1) In the above embodiments, a transport stream is distributed as a digital broadcast. However, the present invention is not limited to this.

A transport stream may be distributed in the context of IPTV, or Video On Demand (VOD).

When a transport stream is distributed in the context of IPTV, a 3D subtitle pair descriptor or a 3D subtitle descriptor is described not in the PMT but in playback control information such as Entry Resource Information (ERI). Alternatively, when a transport stream is distributed by IP network, a 3D subtitle pair descriptor or a 3D subtitle descriptor is described in a header of HTTP or Hypertext Transfer Protocol over Secure Socket Layer (HTTPS).

Alternatively, when a transport stream is distributed in the context of VOD, a 3D subtitle pair descriptor or a 3D subtitle descriptor is described in Electronic Content Guide (ECG) metadata.

Since operation provisions vary according to a distribution form such as an IP broadcast and VOD, the decoder assignment unit 351 is able to determine whether the PMT includes information on a subtitle ES (see step S105) by changing parameters and parameter values used in the determination according to a distribution form by which the decoder assignment unit 351 receives the subtitle ES (IP broadcast, VOD, digital broadcast).

(2) In the above embodiments, a packet of left-view video images store an offset value. However, the present invention is not limited to this.

A packet of right-view video images may store an offset value. In this case, the offset acquisition unit 315 acquires the offset value from the right video decoder 314.

Alternatively, the offset acquisition unit 315 may calculate depth information of video images from a difference between left-view video images and right-view video images, and generates offset information by using the depth information.

(3) In the above embodiment, a digital television is used as an example of a video processing device. However, the present invention is not limited to this. The video processing device may be applied to a DVD recorder, Blu-ray Disc (BD) recorder and Set-Top Box.

(4) Each of the above devices is, specifically, a computer system composed of a microprocessor, ROM, RAM, hard disk unit, display unit, keyboard, mouse, etc. Computer programs are stored on the RAM or the hard disk unit. The microprocessor operates according to the computer programs, and thereby each system accomplishes its functions. In order to achieve predetermined functions, the computer programs are composed of a combination of multiple command codes that indicate instructions for the computer.

(5) Part or all of the components comprising each of the above-described devices may be assembled as one integrated circuit.

Figure 22:
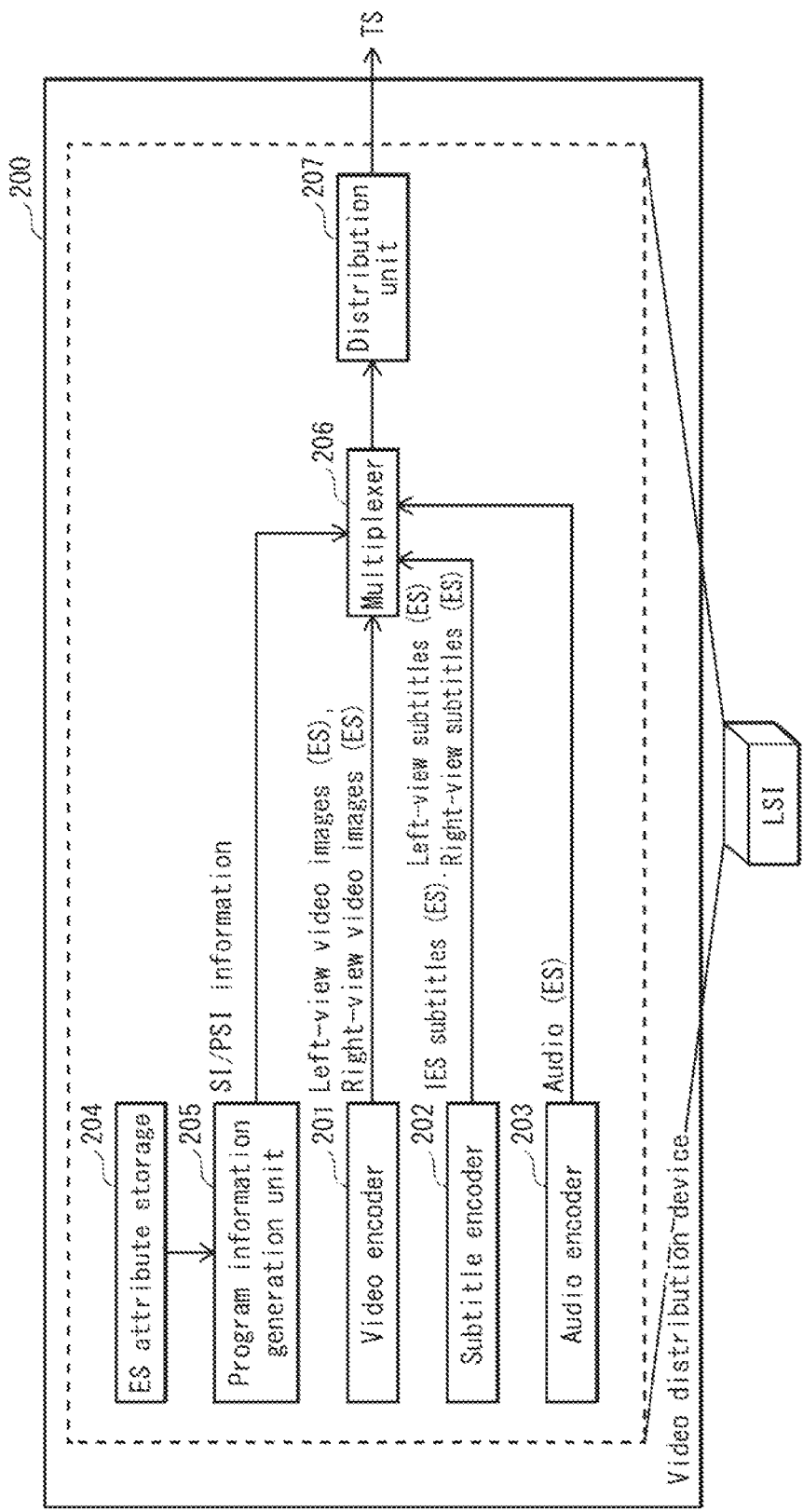
FIG. 22 shows the structure of an LSI that achieves the functions of the video distribution device 200.

For example, each of the functional blocks of the video distribution device 200 in Embodiment 1, i.e., the ES attribute storage 201, the program information generation unit 202, the Video encoder 203, the subtitle encoder 204, the audio encoder 205, the multiplexer 206 or the distribution unit 207 may be typically implemented as an LSI, which is an integrated circuit, as shown in FIG. 22. Individual components may respectively be made into discrete chips, or part or all of the components may be made into one chip.

Each of the functional blocks of the video processing device 300 in Embodiment 1, i.e., the input reception unit 311, the demultiplexer 312, the left video decoder 313, the right video decoder 314, the offset acquisition unit 315, the left-view video output unit 316, the right-view video output unit 317, the subtitle reproduction unit 318, the audio decoder 319, the superimposition units 320 and 321, or the processor 322 may be typically implemented as an LSI, which is an integrated circuit, as shown in FIG. 23. Individual components may respectively be made into discrete chips, or part or all of the components may be made into one chip.

(6) Part or all of the components of each of the above devices may be assembled as an IC card detachable from each device, or as a single module. The IC card/module is a computer system that includes a microprocessor, ROM, RAM, etc. The IC card/module may include therein the above-mentioned ultra-multifunctional LSI. The microprocessor operates according to computer programs, and the IC card/module thereby accomplishes its functions.

(7) A program describing the processing procedures according to the embodiments and the modification examples described above may be stored in a memory, and a Central Processing Unit (CPU) or the like may read and execute the program to realize the processing procedures.

Alternatively, a program describing the processing procedures may be stored on a recording medium to be distributed. Recording media that store the above program include IC cards, hard disks, optical discs, flexible disks, ROM, flash memory, and the like.

(8) The above embodiments and modifications may be combined with one another.

6. Supplementary Explanation (1) One aspect of the present invention provides a video processing device that reproduces a 3D video while receiving a video stream of the 3D video, the video processing device comprising: a reception unit that receives a transport stream including additional information and a data stream of display data, the display data being to be displayed along with the 3D video, the additional information indicating whether the transport stream further includes a pair of a left-view data stream and a right-view data stream respectively generated from left-view data and right-view data used for displaying the display data; a determination unit that determines whether the transport stream includes the pair of the left-view data stream and the right-view data stream based on the additional information; and a display data reproduction unit that reproduces the left-view data and the right-view data respectively from the left-view data stream and the right-view data stream when the determination unit determines that the transport stream includes the pair of the left-view data stream and the right-view data stream, and reproduces alternative left-view data and right-view data, used for displaying the same display data from the data stream, when the determination unit determines that the transport stream does not include the pair of the left-view data stream and the right-view data stream.

According to the above structure, since the video processing device uses additional information included in the transport stream to determine whether the transport stream includes the pair of the left-view data stream and the right-view data stream, the video processing device is able to quickly identify a distribution mode of a stream of the data to be displayed and quickly display the data in 3D according to the identified distribution mode.

(2) The 3D video generated from the video stream may constitute a 3D program, the additional information may be a Program Map Table (PMT) for the 3D program, and the determination unit may make the determination based on whether the PMT includes a description indicating that the transport stream includes the pair of the left-view data stream and the right-view data stream.

With this structure, when the video processing device makes the determination by using the PMT, the video processing device is able to determine whether the transport stream includes the pair of the left-view data stream and the right-view data stream before analyzing the stream that includes the display data. Therefore, the video processing device is able to quickly identify a distribution mode of the stream of the display data.

(3) When the transport stream includes the pair of the left-view data stream and the right-view data stream, the PMT may include a descriptor including information indicating one of the left-view data stream and the right-view data stream, the descriptor may include an identifier indicating the other one of the left-view data stream and the right-view data stream, and the determination unit may make the determination based on whether the PMT includes the descriptor, and when the determination unit determines that the PMT includes the descriptor, the determination unit may acquire the identifier from the descriptor.

With this structure, the video processing device determines whether the PMT includes a descriptor indicating that at least one of the left-view data stream and the right-view data stream is included in the transport stream, and when the PMT includes the descriptor, the video processing device is able to identify the other of the left-view data stream and the right-view data stream. This shortens the amount of time needed for analysis of the PMT.

(4) The determination unit may make the determination based on whether the PMT includes a first descriptor indicating the left-view data stream and a second descriptor indicating the right-view data stream.

With this structure, the video processing device is able to determine whether the transport stream includes the pair of the left-view data stream and the right-view data stream by determining whether the PMT includes both the first descriptor and the second descriptor. Further, the video processing device is able to identify the interrelationship between the left-view data stream and the right-view data stream by determining whether the transport stream includes the pair of the left-view data stream and the right-view data stream.

(5) The additional information may include first determination information and second determination information, the first determination information indicating whether the transport stream includes the pair of the left-view data stream and the right-view data stream, the second determination information indicating whether the display data reproduction unit uses a first reproduction method in which one plane is used or a second reproduction method in which two planes are used to perform the reproduction, the data stream may be a first-type data stream to which the first reproduction method is applied, when the transport stream further includes a second-type data stream generated from left-view data and right-view data used for displaying the display data, the second determination information may indicate that the display data reproduction unit uses the second reproduction method, the determination unit may make the determination by using the first determination information, and when determining that the transport stream does not include the pair of the left-view data stream and the right-view data stream, the determination unit may determine whether the display data reproduction unit uses the first reproduction method or the second reproduction method based on the second determination information, and the display data reproduction unit may reproduce the left-view data and the right-view data respectively from the left-view data stream and the right-view data stream by using the second reproduction method when the determination unit determines that the transport stream includes the pair of the left-view data stream and the right-view data stream, may reproduce the left-view data and the right-view data from the second-type data stream by using the second reproduction method when the determination unit determines that the transport stream does not include the pair of the left-view data stream and the right-view data stream and the second determination information indicates that the display data reproduction unit uses the second reproduction method, and may reproduce the left-view data and the right-view data from the first-type data stream by using the first reproduction method when the determination unit determines that the transport stream does not include the pair of the left-view data stream and the right-view data stream and the second determination information indicates that the display data reproduction unit uses the first reproduction method.

With this structure, the video processing device generates precedence of reproduction of the left-view data and the right-view data based on the left-view data stream, the right-view data stream, the second-type data stream, and the first-type data stream. In general, video images have higher-quality pictures when the left-view data and the right-view data are reproduced from their respective data, compared to the case where the left-view data and the right-view data are reproduced from one data. Further, video images have higher-quality pictures when a left-view stream and a right-view stream are obtained from their respective data, compared to the case where when one stream is obtained from a plurality of pieces of data. Thus, the video processing device is able to preferentially display high-quality data according to the above precedence.

(6) One aspect of the present invention provides a transmission device that transmits a video stream of a 3D video to a video processing device that reproduces the 3D video while receiving the video stream, the transmission device comprising: an additional information generation unit that generates additional information, the additional information indicating whether a transport stream includes a pair of a left-view data stream and a right-view data stream respectively generated from left-view data and right-view data used for displaying display data, the display data being to be displayed along with the 3D video; a stream generation unit that generates a data stream of the display data, and generates the pair of the left-view data stream and the right-view data stream based on the additional information; and a transmission unit that multiplexes the additional information, the video stream and all of the streams generated by the stream generation unit as the transport stream, and transmits the transport stream.

With this structure, the transmission device transmits a transport stream including the additional information to the video processing device, and causes the video processing device to determine whether the transport stream includes the pair of the left-view data stream and the right-view data stream by using the additional information to quickly identify a distribution mode of a stream of the display data, and causes the video processing device to stereoscopically display the display data quickly according to the identified distribution mode.

(7) The 3D video generated from the video stream may constitute a 3D program, the additional information may be a Program Map Table (PMT) for the 3D program, and when the transport stream includes the pair of the left-view data stream and the right-view data stream, the additional information generation unit may describe in the PMT a description indicating that the transport stream includes the pair of the left-view data stream and the right-view data stream.

With this structure, since the transmission device causes the video processing device to make the determination by using the PMT, the transmission device is able to cause the video processing device to determine whether the transport stream includes the pair of the left-view data stream and the right-view data stream before the video processing device analyzes the stream including the display data.

(8) The additional information generation unit may generate, in the PMT, a descriptor that includes information indicating one of the left-view data stream and the right-view data stream and an identifier identifying the other one of the left-view data stream and the right-view data stream.

With this structure, the transmission device includes, in the PMT, a descriptor indicating that the transport stream includes at least one of the left-view data stream and the right-view data stream, and describes an identifier identifying the other of the left-view data stream and the right-view data stream in the descriptor. Accordingly, when the transmission device causes the video processing device to determine whether the PMT includes the descriptor and when the PMT includes the descriptor, the transmission device is able to cause the video processing device to identify the other by using the identifier. This can shorten the amount of time needed for analysis of the PMT.

(4) The additional information generation unit may describe, in the PMT, a first descriptor indicating the left-view data stream, and a second descriptor indicating the right-view data stream.

With this structure, by storing the first descriptor and the second descriptor in the PMT and causing the video processing device to determine whether the PMT includes both of the descriptors, the transmission device is able to cause the video processing device to determine whether the transport stream includes the pair of the left-view data stream and the right-view data stream, and identify interrelation between the left-view data stream and the right-view data stream according to the determination as to whether the PMT includes the descriptors.

(10) The additional information generation unit may generate the additional information including first determination information and second determination information, the first determination information indicating whether the transport stream includes the pair of the left-view data stream and the right-view data stream, the second determination information indicating whether the video processing device uses a first reproduction method in which one plane is used or a second reproduction method in which two planes are used to perform the reproduction, the data stream may be a first-type data stream to which the first reproduction method is applied, when the first determination information indicates that the transport stream does not include the pair of the left-view data stream and the right-view data stream and the second determination information indicates that the video processing device uses the second reproduction method, the stream generation unit may further generate a second-type data stream from left-view data and right-view data used for displaying the display data.

With this structure, since the transmission device transmits the first determination information and the second determination information to the video processing device, the video processing device easily determines whether the transport stream includes the pair of the left-view data stream and the right-view data stream, and identifies a reproduction method of the display data. Further, even when the transport stream does not include the pair of the left-view data stream and the right-view data stream, the transmission device transmits the second-type data stream to the video processing device. As a result, the video processing device reproduces data by using the second reproduction method. The video processing device is therefore able to provide video images having the same quality as the quality of the data generated from the left-view data stream and the right-view data stream.

(11) One aspect of the present invention provides a video processing system including a transmission device that transmits a video stream of a 3D video and a video processing device that reproduces the 3D video while receiving the video stream, wherein the transmission device comprises: an additional information generation unit that generates additional information, the additional information indicating whether a transport stream includes a pair of a left-view data stream and a right-view data stream respectively generated from left-view data and right-view data used for displaying display data, the display data being to be displayed along with the 3D video; a stream generation unit that generates a data stream of the display data, and generates the pair of the left-view data stream and the right-view data stream based on the additional information; and a transmission unit that multiplexes the additional information, the video stream and all of the streams generated by the stream generation unit as the transport stream, and transmits the transport stream, and the video processing device comprises: a reception unit that receives the transport stream including the additional information and the data stream of the display data; a determination unit that determines whether the transport stream includes the pair of the left-view data stream and the right-view data stream based on the additional information; and a display data reproduction unit that reproduces the left-view data and the right-view data respectively from the left-view data stream and the right-view data stream when the determination unit determines that the transport stream includes the pair of the left-view data stream and the right-view data stream, and reproduces alternative left-view data and right-view data, used for displaying the same display data from the data stream, when the determination unit determines that the transport stream does not include the pair of the left-view data stream and the right-view data stream.

With this structure, the transmission device of the video processing system transmits the transport stream including the additional information to the video processing device, and the video processing device uses the additional information included in the transport stream to determine whether the transport stream includes the pair of the left-view data stream and the right-view data stream. This causes the video processing system to quickly identify the distribution mode of the display data, and stereoscopically display the data according to the identified distribution mode.

INDUSTRIAL APPLICABILITY

Each of the video processing system and the video processing device pertaining to the present invention is useful in a device that distributes 3D video images along with subtitles, and a device that receives and displays the video and the subtitles.

REFERENCE SIGNS LIST 100, 100a video processing system
200, 200a video distribution device
201 ES attribute storage
202, 202a program information generation unit
203 video encoder
204, 204a subtitle encoder
205 audio encoder
206 multiplexer
207 distribution unit
300, 301, 302, 300a, 301a, 302a video processing device
311 input reception unit
312, 312a demultiplexer
313 left video decoder
314 right video decoder
315 offset acquisition unit
316 left-view video output unit
317 right-view video output unit
318 subtitle reproduction unit
319 audio decoder
320, 321 superimposition unit
322 display processing unit
350 separation unit
351, 351a decoder assignment unit
360 main subtitle decoder
361 sub subtitle decoder
362 left-view subtitle plane
363 right-view subtitle plane
364 left-view subtitle output unit
365 right-view subtitle output unit

The invention claimed is:

1. A video processing device that reproduces a 3D video while receiving a transport stream of the 3D video, the video processing device comprising:
 a reception unit that receives the transport stream comprising: audio and video data of the 3D video; additional information; and a data stream of display data, the display data being data to be displayed along with the 3D video, the additional information indicating whether the transport stream further includes a left-view data stream and a right-view data stream, the left-view data stream being a data stream generated from left-view data and being different from the right-view data stream, the right view data stream being a data stream generated from right-view data, the left-view data and the right-view data being data for displaying the display data;
 a determination unit that determines whether the transport stream includes the left-view data stream and the right-view data stream based on the additional information in the transport stream received by the reception unit; and
 a display data reproduction unit that reproduces the left-view data and the right-view data respectively from the left-view data stream and the right-view data stream when the determination unit determines that the transport stream includes the left-view data stream and the right-view data stream, and reproduces alternative left-view data and right-view data, for displaying the same display data from the data stream of display data, when the determination unit determines that the transport stream does not include the left-view data stream and the right-view data stream.

2. The video processing device of claim 1, wherein
the 3D video reproduced from the transport stream constitutes a 3D program,
the additional information is a Program Map Table (PMT) for the 3D program, and
the determination unit makes the determination based on whether the PMT includes a description indicating that the transport stream includes the left-view data stream and the right-view data stream.

3. The video processing device of claim 2, wherein
when the transport stream includes the left-view data stream and the right-view data stream, the PMT includes a descriptor including information indicating one of the left-view data stream and the right-view data stream,
the descriptor includes an identifier indicating the other one of the left-view data stream and the right-view data stream, and
the determination unit makes the determination based on whether the PMT includes the descriptor, and when the determination unit determines that the PMT includes the descriptor, the determination unit acquires the identifier from the descriptor.

4. The video processing device of claim 2, wherein
the determination unit makes the determination based on whether the PMT includes a first descriptor indicating the left-view data stream and a second descriptor indicating the right-view data stream.

5. The video processing device of claim 1, wherein
the additional information includes first determination information and second determination information, the first determination information indicating whether the transport stream includes the left-view data stream and the right-view data stream, the second determination information indicating whether the display data reproduction unit uses a first reproduction method in which one plane is used to perform the reproduction, or a second reproduction method in which two planes are used to perform the reproduction,
the data stream is a first-type data stream to which the first reproduction method is applied,
when the transport stream further includes a second-type data stream generated from left-view data and right-view data for displaying the display data, the second determination information indicates that the display data reproduction unit uses the second reproduction method,
the determination unit makes the determination by using the first determination information, and when determining that the transport stream does not include the left-view data stream and the right-view data stream, the determination unit determines whether the display data reproduction unit uses the first reproduction method or the second reproduction method based on the second determination information, and the display data reproduction unit reproduces the left-view data and the right-view data respectively from the left-view data stream and the right-view data stream by using the second reproduction method when the determination unit determines that the transport stream includes the left-view data stream and the right-view data stream, reproduces the left-view data and the right-view data from the second-type data stream by using the second reproduction method when the determination unit determines that the transport stream does not include the left-view data stream and the right-view data stream and the second determination information indicates that the display data reproduction unit uses the second reproduction method, and reproduces the left-view data and the right-view data from the first-type data stream by using the first reproduction method when the determination unit determines that the transport stream does not include the left-view data stream and the right-view data stream and the second determination information indicates that the display data reproduction unit uses the first reproduction method.

6. A transmission device that transmits a transport stream of a 3D video to a video processing device that reproduces the 3D video while receiving the transport stream, the transmission device comprising:

an additional information generation unit that generates additional information, the additional information indicating whether the transport stream includes a left-view data stream and a right-view data stream, the left-view data stream being a data stream generated from left-view data and being different from the right view data stream, the right-view data stream being a data stream generated from right-view data, the left-view data and the right-view data being data for displaying display data, the display data being data to be displayed along with the 3D video;

a stream generation unit that generates a data stream of the display data, and generates the left-view data stream and the right-view data stream based on the additional information; and a transmission unit that multiplexes audio and video data of the 3D video, the additional information, and all of the streams generated by the stream generation unit as the transport stream, and transmits the transport stream.

7. The transmission device of claim 6, wherein the 3D video reproduced from the transport stream constitutes a 3D program, the additional information is a Program Map Table (PMT) for the 3D program, and when the transport stream includes the left-view data stream and the right-view data stream, the additional information generation unit includes in the PMT a description indicating that the transport stream includes the left-view data stream and the right-view data stream.

8. The transmission device of claim 7, wherein the additional information generation unit generates, in the PMT, a descriptor that includes information indicating one of the left-view data stream and the right-view data stream and an identifier identifying the other one of the left-view data stream and the right-view data stream.

9. The transmission device of claim 7, wherein the additional information generation unit includes, in the PMT, a first descriptor indicating the left-view data stream, and a second descriptor indicating the right-view data stream.

10. The transmission device of claim 7, wherein the additional information generation unit generates the additional information so as to include first determination information and second determination information, the first determination information indicating whether the transport stream includes the left-view data stream and the right-view data stream, the second determination information indicating whether the video processing device uses a first reproduction method in which one plane is used to perform the reproduction, or a second reproduction method in which two planes are used to perform the reproduction, the data stream is a first-type data stream to which the first reproduction method is applied, when the first determination information indicates that the transport stream does not include the left-view data stream and the right-view data stream and the second determination information indicates that the video processing device uses the second reproduction method, the stream generation unit further generates a second-type data stream from left-view data and right-view data for displaying the display data.

11. A video processing system including a transmission device that transmits a transport stream of a 3D video, and a video processing device that reproduces the 3D video while receiving the transport stream, wherein the transmission device comprises:

an additional information generation unit that generates additional information, the additional information indicating whether the transport stream includes a left-view data stream and a right-view data stream, the left-view data stream being a data stream generated from left-view data and being different from the right view data stream, the right view data stream being a data stream generated from right-view data, the left-view data and the right-view data being data for displaying display data, the display data being data to be displayed along with the 3D video;

a stream generation unit that generates a data stream of the display data, and generates the left-view data stream and the right-view data stream based on the additional information; and a transmission unit that multiplexes audio and video data of the 3D video, the additional information, and all of the streams generated by the stream generation unit as the transport stream, and transmits the transport stream, and the video processing device comprises:

a reception unit that receives the transport stream a determination unit that determines whether the transport stream includes the left-view data stream and the right-view data stream based on the additional information in the transport stream received by the reception unit; and a display data reproduction unit that reproduces the left-view data and the right-view data respectively from the left-view data stream and the right-view data stream when the determination unit determines that the transport stream includes the left-view data stream and the right-view data stream, and reproduces alternative left-view data and right-view data, for displaying the same display data from the data stream of display data, when the determination unit determines that the transport stream does not include the left-view data stream and the right-view data stream.

12. A video processing method used by a video processing device that reproduces a 3D video while receiving a transport stream of the 3D video, the video processing method comprising the steps of:

receiving the transport stream comprising: audio and video data of the 3D video; additional information; and a data stream of display data, the display data being data to be displayed along with the 3D video, the additional information indicating whether the transport stream further includes a left-view data stream and a right-view data stream, the left-view data stream being a data stream generated from left-view data and being different from the right-view data stream, the right view data stream being a data stream generated from right-view data, the left-view data and the right-view data being data for displaying the display data;

determining whether the transport stream includes the left-view data stream and the right-view data stream based on the additional information in the received transport stream; and reproducing the left-view data and the right-view data respectively from the left-view data stream and the right-view data stream when determining that the transport stream includes the left-view data stream and the right-view data stream, and reproducing alternative left-view data and right-view data, for displaying the same display data from the data stream of display data, when determining that the transport stream does not include the left-view data stream and the right-view data stream.

13. A transmission method used by a transmission device that transmits a transport stream of a 3D video to a video processing device that reproduces the 3D video while receiving the transport stream, the transmission method comprising the steps of:

generating additional information, the additional information indicating whether the transport stream includes a left-view data stream and a right-view data stream, the left-view data stream being a data stream generated from left-view data and being different from the right view data stream, the right-view data stream being a data stream generated from right-view data, the left-view data and the right-view data being data for displaying display data, the display data being data to be displayed along with the 3D video;

generating a data stream of the display data, and generating the left-view data stream and the right-view data stream based on the additional information; and multiplexing audio and video data of the 3D video, the additional information, and all of the streams generated by said generating as the transport stream, and transmitting the transport stream.

14. A non-transitory computer readable storage medium having stored thereon a computer program that causes a video processing device that reproduces a 3D video while receiving a transport stream of the 3D video to perform the steps of:

receiving the transport stream comprising: audio and video data of the 3D video; additional information; and a data stream of display data, the display data being data to be displayed along with the 3D video, the additional information indicating whether the transport stream further includes a left-view data stream and a right-view data stream, the left-view data stream being a data stream generated from left-view data and being different from the right-view data stream, the right view data stream being a data stream generated from right-view data, the left-view data and the right-view data being data for displaying the display data;

determining whether the transport stream includes the left-view data stream and the right-view data stream based on the additional information in the received transport stream; and reproducing the left-view data and the right-view data respectively from the left-view data stream and the right-view data stream when determining that the transport stream includes the left-view data stream and the right-view data stream, and reproducing alternative left-view data and right-view data, for displaying the same display data from the data stream of display data, when determining that the transport stream does not include the left-view data stream and the right-view data stream.

15. A non-transitory computer readable storage medium having stored thereon a computer program executed by a transmission device that transmits a transport stream of a 3D video to a video processing device that reproduces the 3D video while receiving the transport stream, the program comprising the steps of:

generating additional information, the additional information indicating whether the transport stream includes a left-view data stream and a right-view data stream, the left-view data stream being a data stream generated from left-view data and being different from the right view data stream, the right-view data stream being a data stream generated from right-view data, the left-view data and the right-view data being data for displaying display data, the display data being data to be displayed along with the 3D video;

generating a data stream of the display data, and generating the left-view data stream and the right-view data stream based on the additional information; and multiplexing audio and video data of the 3D video, the additional information, and all of the streams generated by said generating as the transport stream, and transmitting the transport stream.

16. An integrated circuit used by a video processing device that reproduces a 3D video while receiving a transport stream of the 3D video, the integrated circuit comprising:

a reception unit that receives the transport stream comprising: audio and video data of the 3D video; additional information; and a data stream of display data, the display data being data to be displayed along with the 3D video, the additional information indicating whether the transport stream further includes a left-view data stream and a right-view data stream, the left-view data stream being a data stream generated from left-view data and being different from the right-view data stream, the right view data stream being a data stream generated from right-view data, the left-view data and the right-view data being data for displaying the display data;

a determination unit that determines whether the transport stream includes the left-view data stream and the right-view data stream based on the additional information in the transport stream received by the reception unit; and a display data reproduction unit that reproduces the left-view data and the right-view data respectively from the left-view data stream and the right-view data stream when the determination unit determines that the transport stream includes the left-view data stream and the right-view data stream, and reproduces alternative left-view data and right-view data, for displaying the same display data from the data stream of display data, when the determination unit determines that the transport stream does not include the left-view data stream and the right-view data stream.

17. An integrated circuit used by a transmission device that transmits a transport stream of a 3D video to a video processing device that reproduces the 3D video while receiving the transport stream, the integrated circuit comprising:
- an additional information generation unit that generates additional information, the additional information indicating whether the transport stream includes a left-view data stream and a right-view data stream, the left-view data stream being a data stream generated from left-view data and being different from the right view data stream, the right-view data stream being a data stream generated from right-view data, the left-view data and the right-view data being data for displaying display data, the display data being data to be displayed along with the 3D video;
- a stream generation unit that generates a data stream of the display data, and generates the left-view data stream and the right-view data stream based on the additional information; and
- a transmission unit that multiplexes audio and video data of the 3D video, the additional information, and all of the streams generated by the stream generation unit as the transport stream, and transmits the transport stream.

* * * * *